(12) United States Patent
Lin et al.

(10) Patent No.: US 10,341,651 B2
(45) Date of Patent: Jul. 2, 2019

(54) IMAGE CODING METHOD, DECODING METHOD, CODING DEVICE AND DECODING DEVICE

(71) Applicants: TONGJI UNIVERSITY, Shanghai (CN); ZTE CORPORATION, Shenzhen (CN)

(72) Inventors: Tao Lin, Shanghai (CN); Ming Li, Shenzhen (CN); Guoqiang Shang, Shenzhen (CN)

(73) Assignees: TONGJI UNIVERSITY, Shanghai (CN); ZTE Corporation, Shenzhen, Guangdong Province (CN)

( * ) Notice: Subject to any disclaimer, the term of this patent is extended or adjusted under 35 U.S.C. 154(b) by 151 days.

(21) Appl. No.: 15/529,998

(22) PCT Filed: Nov. 17, 2015

(86) PCT No.: PCT/CN2015/094817
§ 371 (c)(1),
(2) Date: May 26, 2017

(87) PCT Pub. No.: WO2016/082699
PCT Pub. Date: Jun. 2, 2016

(65) Prior Publication Data
US 2017/0332073 A1    Nov. 16, 2017

(30) Foreign Application Priority Data
Nov. 28, 2014  (CN) .......................... 2014 1 0709902

(51) Int. Cl.
*H04N 19/103*  (2014.01)
*H04N 19/186*  (2014.01)
(Continued)

(52) U.S. Cl.
CPC .......... *H04N 19/103* (2014.11); *H04N 19/176* (2014.11); *H04N 19/182* (2014.11); *H04N 19/186* (2014.11); *H04N 19/593* (2014.11)

(58) Field of Classification Search
CPC .. H04N 19/103; H04N 19/176; H04N 19/182; H04N 19/593; H04N 19/186
See application file for complete search history.

(56) References Cited

U.S. PATENT DOCUMENTS

| 2007/0116370 A1 | 5/2007 | Smirnov |
| 2017/0238001 A1* | 8/2017 | Li .................. H04N 19/436 |
| | | 375/240.12 |

FOREIGN PATENT DOCUMENTS

| CN | 101217668 A | 7/2008 |
| CN | 102098507 A | 6/2011 |

(Continued)

OTHER PUBLICATIONS

Ken McCann et al:, Samsung and BBC response to Call for Proposals on Video Compression Technology, 2010, XP 030007576.
(Continued)

*Primary Examiner* — Nam D Pham
(74) *Attorney, Agent, or Firm* — Ling Wu; Stephen Yang; Ling and Yang Intellectual Property

(57) ABSTRACT

Disclosed is an image coding method, including: determining a coding mode of a coding block; and performing coding on the coding block using multiple coding modes, including performing coding on pixel sample segments in the coding block using one of the multiple coding modes. Further disclosed is an image decoding method, including: parsing bitstream data of a decoding block, and determining decoding modes of pixel sample segments of the decoding block; and performing hybrid decoding on the decoding block using multiple decoding modes, including performing decoding on the pixel sample segments of the decoding (Continued)

block using corresponding decoding modes. The technical scheme described above can fully exploit and utilize the characteristics of each coding image region in the image to improve the image compression performance.

14 Claims, 3 Drawing Sheets

(51) Int. Cl.
*H04N 19/176* (2014.01)
*H04N 19/182* (2014.01)
*H04N 19/593* (2014.01)

(56) References Cited

FOREIGN PATENT DOCUMENTS

| | | |
|---|---|---|
| CN | 102497546 A | 6/2012 |
| CN | 104853209 A | 8/2015 |
| EP | 3107289 A1 | 12/2016 |
| WO | 2016057444 A2 | 4/2016 |

OTHER PUBLICATIONS

Liwei Guo, Palette Mode for Screen Content Coding; Qualcomm Incorporated; JCT-VC of ITU-T SG 16 WP3 and ISO/IEC JTC 1/SC 29/WG 11, 13th Meeting: Incheon, KR, Apr. 16-26, 2013, XP 030057319.

Jianle Chen et al., Description of screen content coding technology proposal by Qualcomm, ; Qualcomm Incorporated; JCT-VC of ITU-T SG 16 WP3 and ISO/IEC JTC1/SC 29/WG 11, 17th Meeting: Valencia, ES, Mar. 27-Apr. 4, 2014, XP 030115916.

Yu-Wen Huang et al., Description of Screen Content Core Experiment 3(SCCE3): palette mode, JCT-VC of ITU-T SG 16 WP3 and ISO/IEC JTC 1/SC 29/WG 11, 17th Meeting: Valencia, ES, Mar. 27-Apr. 4, 2014,XP 030116244.

Meng. Xu et al., CE 7 Test 3: Hybrid 1-D/2-D String-based Index Coding for Palette Index Coding, Huawei USA R& D; JCT-VC of ITU-T SG 16 WP 3 and ISO/IEC JTC 1/SC 29/WG 11, 19th, Meeting: Strasbourg, FR, Oct. 17-24, 2014, XP 030116933.

Tao Lin et al., Non-CE1: Enhancement to Palette Coding by Palette with Pixel Copy (PPC) Coding, Tongji University; JCT-VC of ITU-T SG 16 WP 3 and ISO/IEC JTC 1/SC 29/WG 11, 21st Meeting: Warsaw, PL, Jun. 19-26, 2015, XP 030117555.

\* cited by examiner

IMAGE CODING METHOD, DECODING METHOD, CODING DEVICE AND DECODING DEVICE

TECHNICAL FIELD

The present disclosure relates to, but is not limited to, the field of digital video compression Coding and decoding technologies, and more particularly, to an image coding method, an image decoding method, an image coding apparatus, and an image decoding apparatus.

BACKGROUND

With the development and popularization of a new generation of cloud computing and information processing modes and platforms with remote desktops being typical forms of expression, interconnections between multiple computers, between computer hosts and other digital devices such as smart TVs, smart phones, tablet PCs and between various types of digital devices have become a reality and are becoming gradually a mainstream trend. This makes real-time screen transfer from a server-side (cloud) to a client-side become a current imperative requirement. Due to the large amount of screen video data that needs to be transmitted, taking a 24-bit true color screen image with a resolution of 2048×1536 pixels and a refresh rate of 60 frames per second of a tablet as an example, data is required to be transmitted at a speed of up to 2048×1536×60×24=4320 megabits per second. It is not possible to transmit so much data in real-time under current network conditions, thus effective data compression for computer screen images is essential.

Compressing the computer screen images with ultra-high efficiency by taking full advantage of features of the computer screen images is also a primary objective of the latest international video compression standard HEVC (High Efficiency Video coding) under development and a number of other international standards, domestic standards and industrial standards.

A natural form of digital video signals of screen images (or pictures) is a sequence of images (or pictures). An image is usually a rectangular region consisting of a number of pixels. If there are 50 frames of image per second in a digital video signal, a 30-minute digital video signal is a video image sequence consisting of 30×60×50=90000 frames of image, sometimes referred to as a video sequence or sequence. Performing coding on the digital video signal is to perform coding on the image one by one. At any moment, the image being coded is called the current coding image. Similarly, performing decoding on the compressed video bitstream (also referred to as a bitstream) of the digital video signal is to perform decoding on the bitstream of the image one by one. At any moment, the image being decoded is called the current decoding image. The current coding image or the current decoding image is collectively referred to as the current image.

In almost all international standards for video coding, such as MPEG-1/2/4, H.2649/AVC, and HEVC, when an image is coded, the image is partitioned into sub-images of several blocks of M×M pixels, called "coding units (CUs)". The sub-images are coded block by block using the CU as a basic coding unit. The commonly used size of M is 4, 8, 16, 32, 64. Therefore, performing coding on a video image sequence is to perform coding on each of the coding units of each image, i.e., the CUs are coded one by one. At any moment, the CU being coded is called the current coding CU. Similarly, performing decoding on bitstreams of a video image sequence is to perform decoding on each of the coding units of each image, i.e., the CUs are decoded one by one to reconstruct the entire video image sequence finally. At any moment, the CU being decoded is called the current decoding CU. The current coding CU or the current decoding CU is collectively referred to as the current CU.

In order to accommodate differences among contents and natures of various image portions of an image for efficient coding, the size of each of the CUs in the image can be different, some are 8×8, some are 64×64, and so on. In order to enable seamless splicing of different sizes of CUs, an image is usually first partitioned into "largest coding Units (LCUs)" of the same size with N×N pixels, and then each of the LCUs is further partitioned into multiple CUs with sizes that are not necessarily the same. For example, an image is first partitioned into LCUs of the same size with 64×64 pixel (N=64). One of the LCUs consists of three CUs with 32×32 pixels and four CUs with 16×16 pixels, while another LCU consists of two CUs with 32×32 pixels, three CUs with 16×16 pixels and 20 CUs with 8×8 pixels. Since each CU in a LCU has a tree structure, another name of the LCU is coding Tree Unit (CTU). In the HEVC international standard, LCU and CTU are synonyms.

The CUs can also be further partitioned into a certain number of sub-regions. The sub-regions include prediction units (PUs), transform units (TUs), or asymmetric partitions (AMPs).

A coding block or a decoding block is a region, on which coding or decoding is performed, in an image.

A color pixel is usually composed of three components. The most commonly used two pixel representation formats, i.e., pixel color formats, are a GBR color format composed of a green component, a blue component and a red component, and a YUV color format composed of a luminance (luma) component and two chroma components. The color format collectively known as YUV actually includes a variety of color formats, such as a YCbCr color format. Therefore, when a CU is coded, the CU can be divided into three component planes (G plane, B plane, R plane or Y plane, U plane, V plane), and the three component planes can be coded separately; three components of a pixel can also be bound and combined into a 3-tuple, and the whole CU composed of 3-tuples is coded. The former arrangement of pixels and their components is called a planar format of the image (and its CUs), and the latter arrangement of pixel and their components is called a packed pattern of the image (and its CUs). Both the GBR color format and YUV color format of the pixels are 3-component representation formats of the pixels.

In addition to the 3-component presentation format of the pixels, another common presentation format of the pixels is a palette index presentation format. In the palette index presentation format, a value of one pixel can also be represented by an index of a palette. Values or approximate values of three components of the pixel which need to be represented are stored in a palette space, and an address of the palette is called an index of the pixel stored in the address. An index can represent one component or three components of the pixel. There may be one or more palettes. In the case of multiple palettes, a complete index is actually composed of two parts: a palette number and an index of the palette with the number. An index presentation format of a pixel is to express this pixel using the index. The index presentation format of the pixel is also referred to as an indexed color or pseudo color representation format of the pixel, or is often directly referred to as an indexed pixel or a pseudo pixel or a pixel index or index. The Index is sometimes referred to as index number. The pixel being expressed in its index presentation format is also known as indexing or indexation.

Other commonly used pixel presentation formats of the related techniques include a CMYK presentation format and a grayscale presentation format.

The YUV color format can be subdivided into several seed formats according to whether the chroma components are down-sampled: 1 pixel has a YUV4:4:4 pixel color format composed of 1 Y component, 1 U component and 1 V component; 2 pixels adjacent in a left-to-right direction have a YUV4:2:2 pixel color format composed of 2 Y components, 1 U component and 1 V component; and 4 pixels adjacent in a left-to-right direction and an up-and-down direction and arranged in 2×2 spatial positions have a YUV4:2:0 pixel color format composed of 4 Y components, 1 U component and 1 V component. A component is usually represented by a digit with 8 to 16 bits. Both the YUV4:2:2 pixel color format and the YUV4:2:0 pixel color format are obtained by down-sampling the chroma components for the YUV4:4:4 pixel color format. A pixel component is also called a pixel sample value or simply called a sample value.

The most basic element in coding or decoding can be a pixel, or a pixel component, or a pixel index (i.e., an index pixel). A pixel or a pixel component or a pixel index (index pixel), which is the most basic element for coding or decoding, is collectively referred to as a pixel sample value, sometimes referred to as a pixel value, or simply a sample value.

A CU is a region consisting of several pixel values. The shape of the CU can be rectangular, square, parallelogram, trapezoid, polygon, circle, oval and various other shapes. An rectangle also includes a rectangle with a width or height of one pixel value, degenerated to a line (i.e., a line segment or linear shape). In an image, various CUs may have different shapes and sizes. In an image, some or all of the CUs can have overlapping portions, or all CUs do not overlap with each other. A CU may be composed of "pixels", or "pixel components", or "index pixels", or a combination of three, or any two of them.

A remarkable feature of computer screen images is that there are usually many similar or even identical pixel patterns within the same image. For example, Chinese or foreign characters appearing often in the computer screen image are composed of several types of basic strokes, and a lot of similar or same strokes can be found within the same image. Common menus, icons, etc., in the computer screen images also have many similar or identical patterns.

Coding modes commonly used in coding the related image and video compression technology include:

1) Intra-frame block copy: also known as "intra-frame block matching", or "intra-frame motion compensation", or "block copy", or "block matching". The basic operation for block copy coding or decoding is to copy a reference block of a predetermined size (e.g., 64×64 or 32×32 or 16×16 or 8×8 or 4×4 or 64×32 or 16×32 or 16×4 or 8×4 or 4×8 pixel samples) from a set of the reconstructed reference pixel samples and assign a value of the reference block to the current block.

2) Intra-frame micro-block copy: also known as "intra-frame micro-block matching", or "micro-block copy" or "micro-block matching". In the micro-block copy, blocks (such as 8×8 pixel samples) are partitioned into finer micro-blocks (such as 4×2 pixel samples or 8×2 pixel samples or 2×4 pixel samples or 2×8 pixel samples). The basic operation for micro-block copy coding or decoding is to copy a reference micro-block from a set of the reconstructed reference pixel samples and assign a value of the reference micro-block to the current micro-block.

3) Intra-frame linear line (referred to as line) copy: also known as "intra-frame line matching", or "line copy", or "line matching". The line refers to a micro-block of a height (or width) of 1, such as a micro-block with 4×1 or 8×1 or 1×4 or 1×8 pixel samples. The basic operation for line copy coding or decoding is to copy a reference line from a set of the reconstructed reference pixel samples and assign a value of the reference line to the current line. Obviously, the line copy is a special case of the micro-block copy.

4) Intra-frame string copy: also known as "intra-frame string matching", or "string copy", or "string matching". The string here means that pixel samples in a two-dimensional region of any shape are arranged into a string with the length much larger than the width (for example, a string with a width of 1 pixel sample value and a length of 37 pixel samples, or a string with a width of 2 pixel samples and a length of 111 pixel samples, usually including, but not limited to, a string with a length that is an independent coding or decoding parameter and a width that is a parameter derived from other coding or decoding parameters). The basic operation for string copy coding or decoding is to copy a reference string from a set of the reconstructed reference pixel samples and assign a value of the reference string to the current string. The string copy can be divided into the following sub-types according to a path shape of the string:

4a) One-dimensional horizontal scan string copy

Both the reference string and the current string are one-dimensional pixel sample value strings with the same lengths arranged in an order of horizontally scanning in CTUs or CUs, but two-dimensional regions formed by the two strings respectively do not necessarily have the same two-dimensional shape.

4b) One-dimensional vertical scan string copy

Both the reference string and the current string are one-dimensional pixel sample value strings with the same lengths arranged in an order of vertically scanning in CTUs or CUs, but two-dimensional regions formed by the two strings respectively do not necessarily have the same two-dimensional shape.

4c) Imitating two-dimensional horizontal scanning conformal equal-width string copy (referred to as imitating two-dimensional horizontal string copy)

Both the reference string and the current string with the same lengths are arranged in the identical two-dimensional shape in an order of horizontally scanning, and the width of the formed two-dimensional region is equal to the width of the current coding block or decoding block.

4d) Imitating two-dimensional vertical scanning conformal equal-height string copy (referred to as imitating two-dimensional vertical string copy)

Both the reference string and the current string with the same lengths are arranged in the identical two-dimensional shape in an order of vertically scanning, and the height of the formed two-dimensional region is equal to the height of the current coding block or decoding block.

4e) Two-dimensional horizontal scanning conformal variable-width string copy (referred to as two-dimensional horizontal string copy)

Both the reference string and the current string with the same lengths are arranged in the identical two-dimensional shape in an order of horizontally scanning, and the width of the formed two-dimensional region is not necessarily equal to the width of the current coding block or decoding block, and is not greater than the variable width of the current coding block or decoding block.

4f) Two-dimensional vertical scanning conformal variable-width string copy (referred to as two-dimensional vertical string copy)

Both the reference string and the current string with the same lengths are arranged in the identical two-dimensional shape in an order of vertically scanning, and the height of the formed two-dimensional region is not necessarily equal to the height of the current coding block or decoding block, and is not greater than the variable height of the current coding block or decoding block.

5) Intra-frame rectangle copy (also known as intra-frame rectangle matching or rectangle copy or rectangle matching)

A rectangle here refers to a two-dimensional region of any size characterized by a width and a height. The basic operation for rectangle copy coding or decoding is to copy a reference rectangle from a set of the reconstructed reference pixel samples and assign a value of the reference rectangle to the current rectangle. The reference rectangle and the current rectangle have the same width and height, and thus have the identical two-dimensional rectangular shape. Such rectangle is also formed by a string of pixel samples, the length of which is a product of the height and width of the rectangle, that is, the length of the string is exactly a multiple of the width of the two-dimensional region formed by the string (this multiple is the height of the two-dimensional region), and is also exactly a multiple of the height of the two-dimensional region formed by the string (this multiple is the width of the two-dimensional region). Obviously, the rectangle copy is a special case of 4e) or 4f) described above, that is, a special case where the length of the string is exactly the product of the height and width of the rectangle.

Another coding (decoding) mode commonly used in coding the related image and video compression techniques is a palette coding (decoding) mode. In the palette coding (decoding) mode, a palette is first constructed (acquired), and then part or all of pixels of the current coding block (the current decoding block) are represented by indexes of the palette, and then the indexes are coded (decoded). The way for performing coding (decoding) on the indexes includes run length and/or entropy coding (decoding).

Since screen images have usually regions with various different properties, for example, some have larger or more regularly-shaped similar or same patterns, while others have very small or irregularly-shaped similar or same patterns. Any coding mode is only applicable to coded image regions of a certain type of properties.

It is difficult to find a uniform matching mode for screen images with mixed coded image regions of multiple types of properties. Therefore, a new coding tool is required to be found to fully explore and use characteristics of coded image regions in computer screen images, thereby improving the compression effect.

SUMMARY

The following is an overview of a topic described in detail herein. This overview is not intended to limit the protection scope of claims.

Embodiments of the present disclosure provides an image coding method, an image decoding method, an image coding apparatus, and an image decoding apparatus to solve the technical problem of how to sufficiently exploit and utilize characteristics of various coded image regions in images to improve the image compression effect.

An embodiment of the present disclosure provides an image coding method including:

determining a coding mode of a coding block; and performing hybrid coding on the coding block using multiple coding modes, including performing coding on pixel sample segments in the coding block using one of the multiple coding modes.

In an exemplary embodiment, the method further includes the following feature:

the coding modes include one or more of the following: palette coding, block copy coding, micro-block copy coding, line copy coding, string copy coding, and rectangle copy coding.

In an exemplary embodiment, the method further includes the following feature:

the coding block is a coding region of an image, including at least one of the following: a largest coding unit (LCU), a coding tree unit (CTU), a coding unit (CU), a sub-region of the CU, a prediction unit (PU), a transform unit (TU) and an asymmetric partition (AMP).

In an exemplary embodiment, the method further includes the following feature:

performing coding on the pixel sample segments in the coding block using one of the multiple coding modes includes:

constructing or acquiring a palette and performing palette coding on the pixel sample segments to generate palette parameters related to palette decoding; or performing copy coding on the pixel sample segments to generate copy parameters related to copy coding.

In an exemplary embodiment, the method further includes the following feature:

performing hybrid coding on the coding block using multiple coding modes includes:

writing the parameters generated by performing coding respectively on the pixel sample segments in the coding block into a bitstream of the coding block.

An embodiment of the present disclosure further provides an image decoding method including:

parsing bitstream data of a decoding block, and determining decoding modes of pixel sample segments of the decoding block; and performing hybrid decoding on the decoding block using multiple decoding modes, including performing decoding on the pixel sample segments of the decoding block using corresponding decoding modes.

In an exemplary embodiment, the method further includes the following feature:

the decoding modes include one or more of the following: palette decoding, block copy decoding, micro-block copy decoding, line copy decoding, string copy decoding, and rectangle copy decoding.

In an exemplary embodiment, the method further includes the following feature:

the decoding block is a decoding region of an image, including at least one of the following: a largest coding unit (LCU), a coding tree unit (CTU), a coding unit (CU), a sub-region of the CU, a prediction unit (PU), a transform unit (TU) and an asymmetric partition (AMP).

In an exemplary embodiment, the method further includes the following feature:

performing hybrid decoding on the decoding block using multiple decoding modes includes obtaining parameters of the pixel sample segments from the bitstream data of the decoding block, herein the parameters include palette parameters and/or copy parameters.

In an exemplary embodiment, the method further includes the following feature:

parsing the bitstream data of the decoding block and determining decoding modes corresponding to the pixel sample segments of the decoding block includes:

obtaining indication bits of the decoding modes corresponding to the pixel sample segments from the bitstream data of the decoding block.

In an exemplary embodiment, the method further includes the following feature:

performing decoding on the pixel sample segments of the decoding block using the corresponding decoding modes includes:

when the pixel sample segments use the palette decoding mode, performing palette decoding on the pixel sample segments according to the palette parameters; and/or when the pixel sample segments use the copy decoding mode, performing copy decoding on the pixel sample segments according to the copy parameters.

An embodiment of the present disclosure further provides an image coding apparatus including:

a coding mode determination module configured to determine a coding mode of a coding block; and a coding module configured to perform hybrid coding on the coding block using multiple coding modes, including performing coding on pixel sample segments in the coding block using one of the multiple coding modes.

In an exemplary embodiment, the apparatus further includes the following feature:

the coding modes include one or more of the following: palette coding, block copy coding, micro-block copy coding, line copy coding, string copy coding, and rectangle copy coding.

In an exemplary embodiment, the apparatus further includes the following feature:

the coding block is a coding region of an image, including at least one of the following: a largest coding unit (LCU), a coding tree unit (CTU), a coding unit (CU), a sub-region of the CU, a prediction unit (PU), a transform unit (TU) and an asymmetric partition (AMP).

In an exemplary embodiment, the apparatus further includes the following feature:

the coding module is configured to perform coding on the pixel sample segments in the coding block using one of the multiple coding modes by one of the following ways:

performing palette coding on the pixel sample segments to generate palette parameters related to palette decoding; or performing copy coding on the pixel sample segments to generate copy parameters related to copy coding.

In an exemplary embodiment, the apparatus further includes the following feature:

the coding module is configured to perform hybrid coding on the coding block using the multiple coding modes by the following way:

writing the parameters generated by performing coding respectively on the pixel sample segments in the coding block into a bitstream of the coding block.

An embodiment of the present disclosure further provides an image decoding apparatus including:

a parsing module configured to parse bitstream data of a decoding block, and determine decoding modes of pixel sample segments of the decoding block; and a decoding module configured to perform hybrid decoding on the decoding block, using multiple decoding modes, including performing decoding on the pixel sample segments of the decoding block using corresponding decoding modes.

In an exemplary embodiment, the apparatus further includes the following feature:

the decoding modes include one or more of the following: palette decoding, block copy decoding, micro-block copy decoding, line copy decoding, string copy decoding, and rectangle copy decoding.

In an exemplary embodiment, the apparatus further includes the following feature:

the decoding block is a decoding region of an image, including at least one of the following: a largest coding unit (LCU), a coding tree unit (CTU), a coding unit (CU), a sub-region of the CU, a prediction unit (PU), a transform unit (TU) and an asymmetric partition (AMP).

In an exemplary embodiment, the apparatus further includes the following feature:

the decoding module is configured to perform hybrid decoding on the decoding block using the multiple decoding modes by the following way: obtaining parameters of the pixel sample segments from the bitstream data of the decoding block, herein the parameters include palette parameters and/or copy parameters.

In an exemplary embodiment, the apparatus further includes the following feature:

the parsing module is configured to parse the bitstream data of the current decoding block, and determine decoding modes corresponding to the pixel sample segments of the current decoding block by the following way:

obtaining indication bits of the decoding modes corresponding to the pixel sample segments from the bitstream data of the current decoding block.

In an exemplary embodiment, the apparatus further includes the following feature:

the decoding module is configured to perform decoding on the pixel sample segments of the decoding block using the corresponding decoding modes by the following way:

when the pixel sample segments use the palette decoding mode, performing palette decoding on the pixel sample segments according to the palette parameters; and/or when the pixel sample segments use the copy decoding mode, performing copy decoding on the pixel sample segments according to the copy parameters.

An embodiment of the present disclosure further provides a computer storage medium having computer-executable instructions stored therein used to execute the methods described above.

Compared with the related art, an image coding method, in an image decoding method, an image coding apparatus and an image decoding apparatus are provided by the embodiments of the present disclosure, hybrid coding is performed on a coding block using multiple coding modes, and hybrid decoding is performed on a decoding block using multiple decoding modes using multiple decoding modes, so as to fully explore and use characteristics of various coding image regions in an image, thereby improving the image compression effect.

Other aspects can be understood after the drawings and detailed description are read and understood.

DETAILED DESCRIPTION

Embodiments of the present disclosure will be described in detail below in conjunction with the accompanying drawings. It should be illustrated that the embodiments in the present application and features in the embodiments can be combined with each other arbitrarily without conflict.

Figure 1:
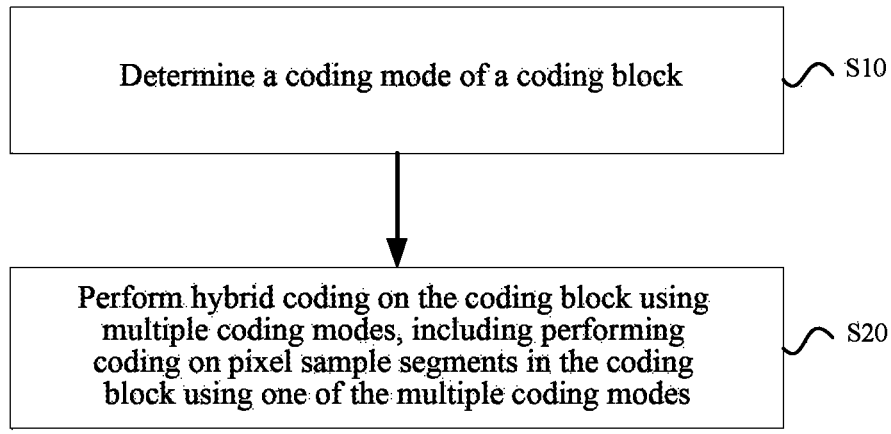
FIG. 1 is a flow chart of an image coding method in accordance with an embodiment of the present disclosure.

As shown in FIG. 1, an embodiment of the present disclosure provides an image coding method including the following steps.

In S10, a coding mode of a coding block is determined.

In S20, hybrid coding is performed on the coding block using multiple coding modes, including performing coding on pixel sample segments in the coding block using one of the multiple coding modes.

The method further includes the following feature:

the coding modes include one or more of the following: palette coding, block copy coding, micro-block copy coding, line copy coding, string copy coding, and rectangle copy coding.

All of the block copy coding, micro-block copy coding, line copy coding, string copy coding, and rectangle copy coding are copy coding.

Performing coding on the pixel sample segments in the coding block using one of the multiple coding modes means, performing coding on any one of the pixel sample segments in the coding block using any one of the multiple coding modes.

The coding block is a coding region of an image, including at least one of the following: a largest coding unit (LCU), a coding tree unit (CTU), a coding unit (CU), a sub-region of the CU, a prediction unit (PU), a transform unit (TU) and an asymmetric partition (AMP).

Performing coding on the pixel sample segments in the coding block using one of the multiple coding modes includes:

constructing or acquiring a palette and performing palette coding on the pixel sample segments to generate palette parameters related to palette decoding; or performing copy coding on the pixel sample segments to generate copy parameters related to copy coding.

Performing hybrid coding on the coding block using the multiple coding modes includes:

writing the parameters generated by performing coding respectively on the pixel sample segments in the coding block into a bitstream of the coding block.

writing the parameters generated by performing coding respectively on the pixel sample segments in the coding block into a bitstream of the coding block includes:

writing indication bits of decoding modes of the pixel segments into the bitstream of the coding block.

The palette parameters include at least one of the following parameters: an index of a palette pixel sample value, a length of an index run for repeating the index, a length of an index run for copying an upper index.

The copy parameters include at least one of the following parameters: a copy position and a copy size.

Performing coding on the pixel sample segments in the coding block using one of the multiple coding modes includes:

when string copy coding is performed on the pixel sample segments in the coding block, obtaining a string of reference pixel samples matching with the pixel sample segments from a set of the reconstructed reference pixel samples according to a copy path shape mode of the string copy coding of the coding block.

The copy path shape mode of the string copy coding includes any one of the following modes.

Mode 1: vertical path one-dimensional string copy mode, where the string of reference pixel samples and a sting of current pixel samples are strings of one-dimensional samples, the samples are scanned column by column, and the samples in a column are scanned vertically from top to bottom.

Mode 2: horizontal path one-dimensional string copy mode, where the string of reference pixel samples and a sting of current pixel samples are strings of one-dimensional samples, the samples are scanned row by row, and the samples in a row are scanned horizontally from left to right.

Mode 3: vertical path two-dimensional conformal copy mode, where the string of reference pixel samples and a sting of current pixel samples are strings of two-dimensional samples with the same shape, the samples are scanned column by column, and the samples in a column are scanned vertically from top to bottom and the columns are scanned from left to right.

Mode 4: horizontal path two-dimensional conformal copy mode, where the string of reference pixel samples and a sting of current pixel samples are strings of two-dimensional samples with the same shape, the samples are scanned row by row, and the samples in a row are scanned horizontally from left to right and the rows are scanned from top to bottom.

Mode 5: derived vertical path one-dimensional string copy mode, where the string of reference pixel samples and a sting of current pixel samples are strings of one-dimensional samples, the samples are scanned column by column, and the samples in a column are scanned vertically with path directions alternating between columns, including that odd columns are scanned from top to bottom and even columns are scanned from bottom to top, or even columns are scanned from top to bottom and odd columns are scanned from bottom to top.

Mode 6: derived horizontal path one-dimensional string copy mode, where the string of reference pixel samples and a sting of current pixel samples are strings of one-dimensional samples, the samples are scanned row by row, and the samples in a row a are scanned horizontally with path directions alternating between rows, including that odd rows are scanned from left to right and even rows are scanned from right to left, or even rows are scanned from left to right and odd rows are scanned from right to left.

Mode 7: derived vertical path two-dimensional conformal copy mode, where the string of reference pixel samples and a sting of current pixel samples are strings of two-dimensional samples with the same shape, the samples are scanned column by column, columns are scanned from left to right, and the samples in a columns are scanned vertically with path directions alternating between columns, including that odd columns are scanned from top to bottom and even columns are scanned from bottom to top, or even columns are scanned from top to bottom and odd columns are scanned from bottom to top.

Mode 8: derived horizontal path two-dimensional conformal copy mode, where the string of reference pixel samples and a sting of current pixel samples are strings of two-dimensional samples with the same shape, the samples are scanned row by row, rows are scanned from top to bottom and the samples in a row are scanned horizontally with path directions alternating between rows, including that odd rows are scanned from left to right and even rows are scanned from right to left, or even rows are scanned from left to right and odd rows are scanned from right to left.

When coding is performed on the coding block using a coding mode of mixing the palette coding and string copy coding, a path scan mode of the palette coding is consistent with the copy path shape mode of the string copy coding.

The method further includes:

Performing coding on information of a copy path shape mode in an image layer information unit corresponding to the image when only one copy path shape mode of the string copy coding is used in coding the image; and/or Performing coding on information of a copy path shape mode in a sequence layer information unit of a video sequence when only one copy path shape mode of the string copy coding is used in coding the video sequence.

The image layer information unit includes at least one of the following: a video parameter set (VPS), a sequence parameter set (SPS), a picture parameter set (PPS), and slice header information; and/or the sequence layer information unit includes at least one of the following: a video parameter set (VPS), a sequence parameter set (SPS), a picture parameter set (PPS), and slice header information.

Performing the copy coding on the pixel sample segments includes obtaining reference pixel sample segments that match with the pixel sample segments from a set of the reconstructed reference pixel samples.

The set of the reconstructed reference pixel samples includes: reconstructed samples and/or variants of the reconstructed samples.

The variants of the reconstructed samples include samples generated by processing and/or transforming the reconstructed samples.

The method further includes:

Performing coding on coding block mode information in the image layer information unit corresponding to an image in which the coding block is located, herein the coding block mode information includes at least one of the following modes:

Mode 1: the image contains four types of coding blocks: Class 1, Class 2, Class 3 and Class 4;

Mode 2: the image contains three types of coding blocks: Class 1, Class 2 and Class 3;

Mode 3: the image contains three types of coding blocks: Class 1, Class 2 and Class 4;

Mode 4: the image contains three types of coding blocks: Class 1, Class 3 and Class 4;

Mode 5: the image contains three types of coding blocks: Class 2, Class 3 and Class 4;

Modes 6 to 11: the image contains two types of coding blocks: any two of Class 1, Class 2, Class 3 and Class 4; and Modes 12 to 15: the image contains a type of coding blocks: any one of Class 1, Class 2, Class 3 and Class 4.

The types of coding blocks include:

Class 1: coding blocks using palette coding, string copy coding and rectangle copy coding;

Class 2: coding blocks using string copy coding and rectangle copy coding;

Class 3: coding blocks using palette coding and string copy coding; and

Class 4: coding blocks using palette coding and rectangle copy coding.

The method further includes:

Performing coding on coding block mode information in the sequence layer information unit corresponding to a video sequence in which the coding block is located, herein the coding block mode information includes at least one of the following modes:

Mode 1: the video sequence contains four types of coding blocks: Class 1, Class 2, Class 3 and Class 4;

Mode 2: the video sequence contains three types of coding blocks: Class 1, Class 2 and Class 3;

Mode 3: the video sequence contains three types of coding blocks: Class 1, Class 2 and Class 4;

Mode 4: the video sequence contains three types of coding blocks: Class 1, Class 3 and Class 4;

Mode 5: the video sequence contains three types of coding blocks: Class 2, Class 3 and Class 4;

Modes 6 to 11: the video sequence contains two types of coding blocks: any two of Class 1, Class 2, Class 3 and Class 4; and Modes 12 to 15: the video sequence contains a type of coding blocks: any one of Class 1, Class 2, Class 3 and Class 4.

The types of coding blocks include:

Class 1: coding blocks using palette coding, string copy coding and rectangle copy coding;

Class 2: coding blocks using string copy coding and rectangle copy coding;

Class 3: coding blocks using palette coding and string copy coding; and

Class 4: coding blocks using palette coding and rectangle copy coding.

The pixel sample segments include one of the following: a pixel, a pixel component, and a pixel index.

The obtained parameters of the pixel sample segments are consisted of multiple sub-parameter fields, coded bits of sub-parameter fields of the same type of the parameters are placed in one or more connecting fields in a bitstream, or are placed in different fields in a bitstream.

The sub-parameter fields of the obtained parameters of the pixel sample segments include a single-component sub-parameter field, a two-component sub-parameter field or a three-component sub-parameter field.

The sub-parameter fields include at least one of the following sub parameter fields:

Sub-parameter field 1: a coding mode type; the coding mode type includes any one of the following types: palette coding, block copy coding, micro-block copy coding, line copy coding, string copy coding, rectangle copy coding, and pixel copy coding without reference;

Sub-parameter field 2: an index or copy position;

Sub-parameter field 3: an index length or copy size; and

Sub-parameter field 4: a pixel sample value without reference.

The method further includes:

writing information fields of the coded pixel sample segments into a bitstream of the coding block, herein the bitstream includes one or more of the following information fields:

Information field 1: a coding mode used by the coding block;

Information field 2: a copy path shape mode;

Information field 3: a pixel sample value arrangement;

Information field 4: a parameter coding mode list corresponding to the information field;

Information field 5: header information for palette coding, including the number of pixels in the palette and values of the pixels or reuse rules;

Information field 6: containing at least one of the following information: a palette coding or copy coding indication bits corresponding to the pixel sample segment, a sample subset number corresponding to the pixel sample segment or empty, an index or copy position corresponding to the pixel sample segment, an index length or copy size corresponding to the pixel sample segment and a pixel sample value without reference corresponding to the pixel sample segment pixel sample value or empty; and Information field 7: a copy residual or empty.

Determining the coding mode of the coding block includes:

constructing or acquiring a palette, and/or performing pre-coding on the pixels of the coding block to determine the coding mode of the pixel sample segment, and/or determining the copy path shape mode of the string copy coding of the coding block, and/or determining the path scan mode of the palette coding of the coding block.

An embodiment of the present disclosure further provides a computer storage medium having computer-executable instructions stored therein used to execute the methods described above.

Figure 2:
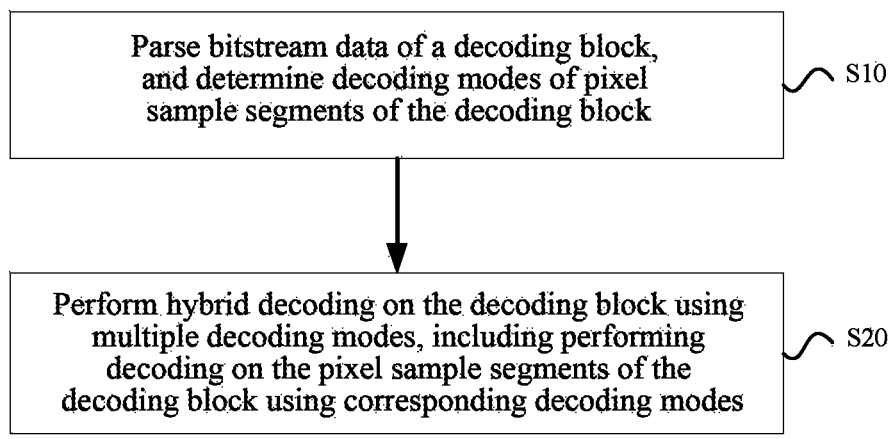
FIG. 2 is a flow chart of an image decoding method in accordance with an embodiment of the present disclosure.

As show in FIG. 2, an embodiment of the present disclosure provides an image decoding method including the following steps.

In S10, bitstream data of a decoding block are parsed, and decoding modes of pixel sample segments of the decoding block are determined.

In S20, hybrid decoding is performed on the decoding block using multiple decoding modes, including performing decoding on the pixel sample segments of the decoding block using corresponding decoding modes.

The method further includes the following feature:

the decoding modes include one or more of the following: palette decoding, block copy decoding, micro-block copy decoding, line copy decoding, string copy decoding, and rectangle copy decoding.

All of the block copy decoding, micro-block copy decoding, line copy decoding, string copy decoding, and rectangle copy decoding are copy decoding.

The decoding block is a decoding region of an image, including at least one of the following: a largest coding unit (LCU), a coding tree unit (CTU), a coding unit (CU), a sub-region of the CU, a prediction unit (PU), a transform unit (TU) and an asymmetric partition (AMP).

The decoding block includes one or more pixel sample segments, each of the pixel sample segments corresponding to one of the multiple decoding modes.

Performing hybrid decoding on the decoding block using the multiple decoding modes includes obtaining parameters of the pixel sample segments from the bitstream data of the decoding block.

The parameters include palette parameters and/or copy parameters.

The palette parameters are used for palette decoding, and the copy parameters are used for copy decoding.

Parsing the bitstream data of the decoding block and determining decoding modes corresponding to the pixel sample segments of the decoding block includes:

obtaining indication bits of the decoding modes corresponding to the pixel sample segments from the bitstream data of the decoding block.

Performing decoding on the pixel sample segments of the decoding block using the corresponding decoding modes includes:

when the pixel sample segments use the palette decoding mode, performing palette decoding on the pixel sample segments according to the palette parameters; and/or when the pixel sample segments use the copy decoding mode, performing copy decoding on the pixel sample segments according to the copy parameters.

The palette parameters include at least one of the following: an index of a palette pixel sample value, a length of an index run for repeating the index, a length of an index run for copying an upper index.

The copy parameters include at least one of the following: a copy position and a copy size.

When the pixel sample segments use the copy decoding mode, performing copy decoding on the pixel sample segments according to the copy parameters includes:

when the pixel sample segments use string copy decoding, determining a copy path shape mode of the string copy decoding of the decoding block and obtaining a string of reference pixel samples from a set of the reconstructed reference pixel samples according to the copy path shape mode and the copy parameters.

After the string of reference pixel samples is obtained from the set of the reconstructed reference pixel samples according to the copy path shape mode and the copy parameters, the method further includes assigning values of the string of reference pixel samples directly or indirectly to the pixel sample segments.

The copy path shape mode of the string copy decoding includes any one of the following modes.

Mode 1: vertical path one-dimensional string copy mode, where the string of reference pixel samples and a sting of current pixel samples are strings of one-dimensional samples, the samples are scanned column by column, and the samples in a column are scanned vertically from top to bottom.

Mode 2: horizontal path one-dimensional string copy mode, where the string of reference pixel samples and a sting of current pixel samples are strings of one-dimensional samples, the samples are scanned row by row, and the samples in a row are scanned horizontally from left to right.

Mode 3: vertical path two-dimensional conformal copy mode, where the string of reference pixel samples and a sting of current pixel samples are strings of two-dimensional samples with the same shape, the samples are scanned column by column, and the samples in a column are scanned vertically from top to bottom and the columns are scanned from left to right.

Mode 4: horizontal path two-dimensional conformal copy mode, where the string of reference pixel samples and a sting of current pixel samples are strings of two-dimensional samples with the same shape, the samples are scanned row by row, and the samples in a row are scanned horizontally from left to right and the rows are scanned from top to bottom.

Mode 5: derived vertical path one-dimensional string copy mode, where the string of reference pixel samples and a sting of current pixel samples are strings of one-dimensional samples, the samples are scanned column by column, and the samples in a column are scanned vertically with path directions alternating between columns, including that odd columns are scanned from top to bottom and even columns are scanned from bottom to top, or even columns are scanned from top to bottom and odd columns are scanned from bottom to top.

Mode 6: derived horizontal path one-dimensional string copy mode, where the string of reference pixel samples and a sting of current pixel samples are strings of one-dimensional samples, the samples are scanned row by row, and the samples in a row are scanned horizontally with path directions alternating between rows, including that odd rows are scanned from left to right and even rows are scanned from right to left, or even rows are scanned from left to right and odd rows are scanned from right to left.

Mode 7: derived vertical path two-dimensional conformal copy mode, where the string of reference pixel samples and a sting of current pixel samples are strings of two-dimensional samples with the same shape, the samples are scanned column by column, columns are scanned from left to right, and the samples in a columns are scanned vertically with path directions alternating between columns, including that odd columns are scanned from top to bottom and even columns are scanned from bottom to top, or even columns are scanned from top to bottom and odd columns are scanned from bottom to top.

Mode 8: derived horizontal path two-dimensional conformal copy mode, where the string of reference pixel samples and a sting of current pixel samples are strings of two-dimensional samples with the same shape, the samples are scanned row by row, rows are scanned from top to bottom and the samples in a row are scanned horizontally with path directions alternating between rows, including that odd rows are scanned from left to right and even rows are scanned from right to left, or even rows are scanned from left to right and odd rows are scanned from right to left.

When decoding is performed on the decoding block using a decoding mode of mixing the palette decoding and string copy decoding, a path scan mode of the palette decoding is consistent with the copy path shape mode of the string copy decoding.

The set of the reconstructed reference pixel samples includes: reconstructed samples and/or variants of the reconstructed samples.

The variants of the reconstructed samples include samples generated by processing and/or transforming the reconstructed samples.

The method further includes:
obtaining information of the copy path shape mode from an image layer information unit of the image, herein the information indicates that all decoding blocks in the image use designated copy path shape modes; and/or
obtaining information of the copy path shape mode from a sequence layer information unit of a video sequence, herein the information indicates that all decoding blocks in the sequence use designated copy path shape modes.

The image layer information unit includes at least one of the following: a video parameter set (VPS), a sequence parameter set (SPS), a picture parameter set (PPS), and slice header information; and/or the sequence layer information unit includes at least one of the following: a video parameter set (VPS), a sequence parameter set (SPS), a picture parameter set (PPS), and slice header information.

The method further includes:
obtaining decoding block mode information in the image layer information unit corresponding to an image in which the decoding block is located, herein the decoding block mode information includes at least one of the following modes:
Mode 1: the image contains four types of decoding blocks: Class 1, Class 2, Class 3 and Class 4;
Mode 2: the image contains three types of decoding blocks: Class 1, Class 2 and Class 3;
Mode 3: the image contains three types of decoding blocks: Class 1, Class 2 and Class 4;
Mode 4: the image contains three types of decoding blocks: Class 1, Class 3 and Class 4;
Mode 5: the image contains three types of decoding blocks: Class 2, Class 3 and Class 4;
Modes 6 to 11: the image contains two types of decoding blocks: any two of Class 1, Class 2, Class 3 and Class 4; and
Modes 12 to 15: the image contains a type of decoding blocks: any one of Class 1, Class 2, Class 3 and Class 4.

The types of decoding blocks include:
Class 1: decoding blocks using palette decoding, string copy decoding and rectangle copy decoding;
Class 2: decoding blocks using string copy decoding and rectangle copy decoding;
Class 3: decoding blocks using palette decoding and string copy decoding; and
Class 4: decoding blocks using palette decoding and rectangle copy decoding.

The method further includes:
obtaining decoding block mode information in the sequence layer information unit corresponding to a video sequence in which the decoding block is located, herein the decoding block mode information includes at least one of the following modes:
Mode 1: the video sequence contains four types of decoding blocks: Class 1, Class 2, Class 3 and Class 4;
Mode 2: the video sequence contains three types of decoding blocks: Class 1, Class 2 and Class 3;
Mode 3: the video sequence contains three types of decoding blocks: Class 1, Class 2 and Class 4;
Mode 4: the video sequence contains three types of decoding blocks: Class 1, Class 3 and Class 4;
Mode 5: the video sequence contains three types of decoding blocks: Class 2, Class 3 and Class 4;
Modes 6 to 11: the video sequence contains two types of decoding blocks: any two of Class 1, Class 2, Class 3 and Class 4; and
Modes 12 to 15: the video sequence contains a type of decoding blocks: any one of Class 1, Class 2, Class 3 and Class 4.

The types of decoding blocks include:
Class 1: decoding blocks using palette decoding, string copy decoding and rectangle copy decoding;
Class 2: decoding blocks using string copy decoding and rectangle copy decoding;
Class 3: decoding blocks using palette decoding and string copy decoding; and
Class 4: decoding blocks using palette decoding and rectangle copy decoding.

The pixel sample segments include one of the following: a pixel, a pixel component, and a pixel index.

The obtained parameters of the pixel sample segments are consisted of multiple sub-parameter fields, input bits of sub-parameter fields of the same type of the obtained parameters are obtained in one or more connecting fields in a bitstream, or are obtained in different fields in a bitstream.

The sub-parameter fields of the obtained parameters of the pixel sample segments include a single-component sub-parameter field, a two-component sub-parameter field or a three-component sub-parameter field.

The sub-parameter fields of the decoded parameters include at least one of the following sub-parameter fields:
Sub-parameter field 1: a decoding mode type; the coding mode type include any one of the following types: palette decoding, block copy decoding, micro-block copy decoding, line copy decoding, string copy decoding, rectangle copy decoding, and pixel copy decoding without reference;
Sub-parameter field 2: an index or copy position;

Sub-parameter field 3: an index length or copy size; and

Sub-parameter field 4: a pixel sample value without reference.

Parsing the bitstream of the decoding block and determining the decoding modes of the pixel sample segments of the decoding block includes:

decoding information fields of the decoded pixel sample segments into a bitstream of the decoding block, herein the bitstream includes one or more of the following information fields:

Information field 1: a decoding mode used by the decoding block;

Information field 2: a copy path shape mode;

Information field 3: a pixel sample value arrangement;

Information field 4: a parameter decoding mode list corresponding to the information field;

Information field 5: header information for palette decoding, including the number of pixels in the palette and values of the pixels or reuse rules;

Information field 6: containing at least one of the following information: a palette decoding or copy decoding indication bits corresponding to the pixel sample segment, a sample subset number corresponding to the pixel sample segment or empty, an index or copy position corresponding to the pixel sample segment, an index length or copy size corresponding to the pixel sample segment, and a pixel sample value without reference corresponding to the pixel sample segment pixel sample value or empty; and Information field 7: a copy residual or empty.

An embodiment of the present disclosure further provides a computer storage medium having computer-executable instructions stored therein used to execute the method described above.

Figure 3:
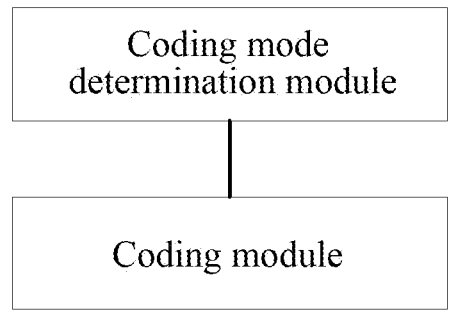
FIG. 3 is a block diagram of an image coding apparatus in accordance with an embodiment of the present disclosure.

As shown in FIG. 3, an embodiment of the present disclosure provides an image coding apparatus including:

a coding mode determination module configured to determine a coding mode of a coding block; and a coding module configured to perform hybrid coding on the coding block using multiple coding modes, including performing coding on pixel sample segments in the coding block using one of the multiple coding modes.

The apparatus may further include the following features:

the coding modes include one or more of the following: palette coding, block copy coding, micro-block copy coding, line copy coding, string copy coding, and rectangle copy coding.

The coding block is a coding region of an image, including at least one of the following: a largest coding unit (LCU), a coding tree unit (CTU), a coding unit (CU), a sub-region of the CU, a prediction unit (PU), a transform unit (TU) and an asymmetric partition (AMP).

The coding module is configured to perform coding on the pixel sample segments in the coding block using one of the multiple coding modes by the following way:

performing palette coding on the pixel sample segments to generate palette parameters related to palette decoding; or performing copy coding on the pixel sample segments to generate copy parameters related to copy coding.

The coding module is configured to perform hybrid coding on the coding block using the multiple coding modes by the following way:

writing the parameters generated by performing coding respectively on the pixel sample segments in the coding block into a bitstream of the coding block.

The coding module is configured to write the parameters generated by performing coding respectively on the pixel sample segments in the coding block into the bitstream of the coding block by the following way:

writing indication bits of decoding modes of the pixel segments into the bitstream of the coding block.

The palette parameters include at least one of the following parameters: an index of a palette pixel sample value, a length of an index run for repeating the index, a length of an index run for copying an upper index.

The copy parameters include at least one of a copy position and a copy size.

The coding module is configured to perform coding on the pixel sample segments in the coding block using one of the multiple coding modes by the following way:

when string copy coding is performed on the pixel sample segments in the coding block, obtaining a string of reference pixel samples matching with the pixel sample segments from a set of the reconstructed reference pixel samples according to a copy path shape mode of the string copy coding of the coding block.

The copy path shape mode of the string copy coding includes any one of the following modes:

Mode 1: vertical path one-dimensional string copy mode, where the string of reference pixel samples and a sting of current pixel samples are strings of one-dimensional samples, the samples are scanned column by column, and the samples in a column are scanned vertically from top to bottom;

Mode 2: horizontal path one-dimensional string copy mode, where the string of reference pixel samples and a sting of current pixel samples are strings of one-dimensional samples, the samples are scanned row by row, and the samples in a row are scanned horizontally from left to right;

Mode 3: vertical path two-dimensional conformal copy mode, where the string of reference pixel samples and a sting of current pixel samples are strings of two-dimensional samples with the same shape, the samples are scanned column by column, and the samples in a column are scanned vertically from top to bottom and the columns are scanned from left to right;

Mode 4: horizontal path two-dimensional conformal copy mode, where the string of reference pixel samples and a sting of current pixel samples are strings of two-dimensional samples with the same shape, the samples are scanned row by row, and the samples in a row are scanned horizontally from left to right and the rows are scanned from top to bottom;

Mode 5: derived vertical path one-dimensional string copy mode, where the string of reference pixel samples and a sting of current pixel samples are strings of one-dimensional samples, the samples are scanned column by column, and the samples the samples in a column are scanned vertically with path directions alternating between columns, including that odd columns are scanned from top to bottom and even columns are scanned from bottom to top, or even columns are scanned from top to bottom and odd columns are scanned from bottom to top;

Mode 6: derived horizontal path one-dimensional string copy mode, where the string of reference pixel samples and a sting of current pixel samples are strings of one-dimensional samples, the samples are scanned row by row, and the samples in a row are scanned horizontally with path directions alternating between rows, including that odd rows are scanned from left to right and even rows are scanned from right to left, or even rows are scanned from left to right and odd rows are scanned from right to left;

Mode 7: derived vertical path two-dimensional conformal copy mode, where the string of reference pixel samples and a sting of current pixel samples are strings of two-dimensional samples with the same shape, the samples are scanned column by column, columns are scanned from left to right, and the samples in a column are scanned vertically with path directions alternating between columns, including that odd columns are scanned from top to bottom and even columns are scanned from bottom to top, or even columns are scanned from top to bottom and odd columns are scanned from bottom to top; and Mode 8: derived horizontal path two-dimensional conformal copy mode, where the string of reference pixel samples and a sting of current pixel samples are strings of two-dimensional samples with the same shape, the samples are scanned row by row, rows are scanned from top to bottom and the samples in a row are scanned horizontally with path directions alternating between rows, including that odd rows are scanned from left to right and even rows are scanned from right to left, or even rows are scanned from left to right and odd rows are scanned from right to left.

When coding is performed on the coding block using a coding mode of mixing the palette coding and string copy coding, a path scan mode of the palette coding is consistent with the copy path shape mode of the string copy coding.

The coding module is configured to perform coding on information of a copy path shape mode in an image layer information unit corresponding to the image when only one copy path shape mode of the string copy coding is used in coding the image; and/or perform coding on information of a copy path shape mode in a sequence layer information unit of a video sequence when only one copy path shape mode of the string copy coding is used in coding the video sequence.

The image layer information unit includes at least one of the following: a video parameter set (VPS), a sequence parameter set (SPS), a picture parameter set (PPS), and slice header information; and/or the sequence layer information unit includes at least one of a video parameter set (VPS), a sequence parameter set (SPS), a picture parameter set (PPS), and slice header information.

The coding module is configured to perform the copy coding on the pixel sample segments by the following way: obtaining reference pixel sample segments that match with the pixel sample segments from a set of the reconstructed reference pixel samples.

The set of the reconstructed reference pixel samples includes: the reconstructed samples and/or variants of the reconstructed samples.

The variants of the reconstructed samples include samples generated by processing and/or transforming the reconstructed samples.

The coding module is further configured to perform coding on coding block mode information in the image layer information unit corresponding to an image in which the coding block is located, herein the coding block mode information includes at least one of the following modes:

Mode 1: the image contains four types of coding blocks: Class 1, Class 2, Class 3 and Class 4;

Mode 2: the image contains three types of coding blocks: Class 1, Class 2 and Class 3;

Mode 3: the image contains three types of coding blocks: Class 1, Class 2 and Class 4;

Mode 4: the image contains three types of coding blocks: Class 1, Class 3 and Class 4;

Mode 5: the image contains three types of coding blocks: Class 2, Class 3 and Class 4;

Modes 6 to 11: the image contains two types of coding blocks: any two of Class 1, Class 2, Class 3 and Class 4; and Modes 12 to 15: the image contains a type of coding blocks: any one of Class 1, Class 2, Class 3 and Class 4.

The types of coding blocks include:

Class 1: coding blocks using palette coding, string copy coding and rectangle copy coding;

Class 2: coding blocks using string copy coding and rectangle copy coding;

Class 3: coding blocks using palette coding and string copy coding; and

Class 4: coding blocks using palette coding and rectangle copy coding.

The coding module is further configured to perform coding on coding block mode information in the sequence layer information unit corresponding to a video sequence in which the coding block is located, herein the coding block mode information includes at least one of the following modes:

Mode 1: the video sequence contains four types of coding blocks: Class 1, Class 2, Class 3 and Class 4;

Mode 2: the video sequence contains three types of coding blocks: Class 1, Class 2 and Class 3;

Mode 3: the video sequence contains three types of coding blocks: Class 1, Class 2 and Class 4;

Mode 4: the video sequence contains three types of coding blocks: Class 1, Class 3 and Class 4;

Mode 5: the video sequence contains three types of coding blocks: Class 2, Class 3 and Class 4;

Modes 6 to 11: the video sequence contains two types of coding blocks: any two of Class 1, Class 2, Class 3 and Class 4; and Modes 12 to 15: the video sequence contains a type of coding blocks: any one of Class 1, Class 2, Class 3 and Class 4.

The types of coding blocks include:

Class 1: coding blocks using palette coding, string copy coding and rectangle copy coding;

Class 2: coding blocks using string copy coding and rectangle copy coding;

Class 3: coding blocks using palette coding and string copy coding; and

Class 4: coding blocks using palette coding and rectangle copy coding.

The pixel sample segments include one of the following: a pixel, a pixel component, and a pixel index.

The obtained parameters of the pixel sample segments are consisted of multiple sub-parameter fields, the coded bits of sub-parameter fields of the same type of the parameters are placed in one or more connecting fields in a bitstream, or are placed in different fields in the bitstream.

The sub-parameter fields of the obtained parameters of the pixel sample segments include a single-component sub-parameter field, a two-component sub-parameter field or a three-component sub-parameter field.

The sub-parameter fields include at least one of the following sub parameter fields:

Sub-parameter field 1: a coding mode type; the coding mode type includes any one of the following types: palette coding, block copy coding, micro-block copy coding, line copy coding, string copy coding, rectangle copy coding, and pixel copy coding without reference;

Sub-parameter field 2: an index or copy position;

Sub-parameter field 3: an index length or copy size; and

Sub-parameter field 4: a pixel sample value without reference.

The coding module is further configured to perform hybrid coding on information fields of the pixel sample segments into a bitstream corresponding to the coding block, herein the bitstream includes one or more of the following information fields:

Information field 1: a coding mode used by the coding block;

Information field 2: a copy path shape mode;

Information field 3: a pixel sample value arrangement;

Information field 4: a parameter coding mode list corresponding to the information field;

Information field 5: header information for palette coding, including the number of pixels in the palette and values of the pixels or reuse rules;

Information field 6: containing at least one of the following information: a palette coding or copy coding indication bits corresponding to the pixel sample segment, a sample subset number corresponding to the pixel sample segment or empty, an index or copy position corresponding to the pixel sample segment, an index length or copy size corresponding to the pixel sample segment, and a pixel sample value without reference corresponding to the pixel sample segment pixel sample value or empty; and Information field 7: a copy residual or empty.

The coding mode determination module is configured to determine the coding mode of the coding block by the following way: constructing or acquiring a palette, and/or performing pre-coding on the pixels of the coding block to determine the coding mode of the pixel sample segment, and/or determining the copy path shape mode of the string copy coding of the coding block, and/or determining the path scan mode of the palette coding of the coding block.

Figure 4:
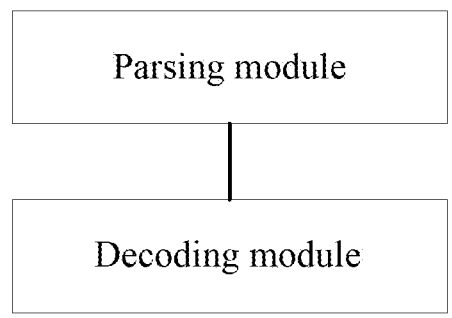
FIG. 4 is a block diagram of an image decoding apparatus in accordance with an embodiment of the present disclosure.

As shown in FIG. 4, an embodiment of the present disclosure provides an image decoding apparatus including:

a parsing module configured to parse bitstream data of a decoding block, and determine decoding modes of pixel sample segments of the decoding block; and a decoding module configured to perform hybrid decoding on the decoding block using multiple decoding modes, including performing decoding on the pixel sample segments of the decoding block using corresponding decoding modes.

The apparatus may further include the following features:

the decoding modes include one or more of the following: palette decoding, block copy decoding, micro-block copy decoding, line copy decoding, string copy decoding, and rectangle copy decoding.

The decoding block is a decoding region of an image, including at least one of the following: a largest coding unit (LCU), a coding tree unit (CTU), a coding unit (CU), a sub-region of the CU, a prediction unit (PU), a transform unit (TU) and an asymmetric partition (AMP).

The decoding module is configured to perform decoding on the decoding block using the multiple coding modes by the following way: obtaining parameters of the pixel sample segments from the bitstream data of the decoding block, herein the obtained parameters of the pixel sample segments include palette parameters and/or copy parameters.

The parsing module is configured to parse the bitstream data of the current decoding block, and determine decoding modes corresponding to the pixel sample segments of the current decoding block by the following way:

obtaining indication bits of the decoding modes corresponding to the pixel sample segments from the bitstream data of the current decoding block.

The decoding module is configured to perform decoding on the pixel sample segments of the decoding block using the corresponding decoding modes by the following way:

when the pixel sample segments use the palette decoding mode, performing palette decoding on the pixel sample segments according to the palette parameters; and/or when the pixel sample segments use the copy decoding mode, performing copy decoding on the pixel sample segments according to the copy parameters.

The palette parameters include at least one of the following: an index of a palette pixel sample value, a length of an index run for repeating the index, a length of an index run for copying an upper index.

The copy parameters include at least one of the following: a copy position and a copy size.

The decoding module is configured to, when the pixel sample segments use the copy decoding mode, perform copy decoding on the pixel sample segments according to the copy parameters by the following way:

when the pixel sample segments use string copy decoding, determining a copy path shape mode of the string copy decoding of the decoding block and obtaining a string of reference pixel samples from a set of reconstructed reference pixel samples according to the copy path shape mode and the copy parameters.

The decoding module is further configured to, after the string of reference pixel samples is obtained from the set of the reconstructed reference pixel samples according to the copy path shape mode and the copy parameters, assign values of the string of reference pixel samples directly or indirectly to the pixel sample segments.

The copy path shape mode of the string copy decoding includes any one of the following modes:

Mode 1: vertical path one-dimensional string copy mode, where the string of reference pixel samples and a sting of current pixel samples are strings of one-dimensional samples, the samples are scanned column by column, and the samples in a column are scanned vertically from top to bottom;

Mode 2: horizontal path one-dimensional string copy mode, where the string of reference pixel samples and a sting of current pixel samples are strings of one-dimensional samples, the samples are scanned row by row, and the samples in a row are scanned horizontally from left to right;

Mode 3: vertical path two-dimensional conformal copy mode, where the string of reference pixel samples and a sting of current pixel samples are strings of two-dimensional samples with the same shape, the samples are scanned column by column, and the samples in a column are scanned vertically from top to bottom and the columns are scanned from left to right;

Mode 4: horizontal path two-dimensional conformal copy mode, where the string of reference pixel samples and a sting of current pixel samples are strings of two-dimensional samples with the same shape, the samples are scanned row by row, and the samples in a row are scanned horizontally from left to right and the rows are scanned from top to bottom;

Mode 5: derived vertical path one-dimensional string copy mode, where the string of reference pixel samples and a sting of current pixel samples are strings of one-dimensional samples, the samples are scanned column by column, and the samples in a column are scanned vertically with path directions alternating between columns, including that odd columns are scanned from top to bottom and even columns are scanned from bottom to top, or even columns are scanned from top to bottom and odd columns are scanned from bottom to top;

Mode 6: derived horizontal path one-dimensional string copy mode, where the string of reference pixel samples and a sting of current pixel samples are strings of one-dimensional samples, the samples are scanned row by row, and the samples in a row are scanned horizontally with path directions alternating between rows, including that odd rows are scanned from left to right and even rows are scanned from right to left, or even rows are scanned from left to right and odd rows are scanned from right to left;

Mode 7: derived vertical path two-dimensional conformal copy mode, where the string of reference pixel samples and a sting of current pixel samples are strings of two-dimensional samples with the same shape, the samples are scanned column by column, columns are scanned from left to right, and the samples in a column are scanned vertically with path directions alternating between columns, including that odd columns are scanned from top to bottom and even columns are scanned from bottom to top, or even columns are scanned from top to bottom and odd columns are scanned from bottom to top; and Mode 8: derived horizontal path two-dimensional conformal copy mode, where the string of reference pixel samples and a sting of current pixel samples are strings of two-dimensional samples with the same shape, the samples are scanned row by row, rows are scanned from top to bottom and the samples in a row are scanned horizontally with path directions alternating between rows, including that odd rows are scanned from left to right and even rows are scanned from right to left, or even rows are scanned from left to right and odd rows are scanned from right to left.

When decoding is performed on the decoding block using a decoding mode of mixing the palette decoding and string copy decoding, a path scan mode of the palette decoding is consistent with the copy path shape mode of the string copy decoding.

The set of the reconstructed reference pixel samples includes: the reconstructed samples and/or variants of the reconstructed samples.

The variants of the reconstructed samples include samples generated by processing and/or transforming the reconstructed samples.

The parsing module is configured to obtain information of the copy path shape mode from an image layer information unit of the image, herein the information indicates that all decoding blocks in the image use designated copy path shape modes; and/or obtain information of the copy path shape mode from a sequence layer information unit of a video sequence, herein the information indicates that all decoding blocks in the sequence use designated copy path shape modes.

The image layer information unit includes at least one of the following: a video parameter set (VPS), a sequence parameter set (SPS), a picture parameter set (PPS), and slice header information; and/or the sequence layer information unit includes at least one of the following: a video parameter set (VPS), a sequence parameter set (SPS), a picture parameter set (PPS), and slice header information.

The parsing module is further configured to obtain decoding block mode information in the image layer information unit corresponding to an image in which the decoding block is located, herein the decoding block mode information includes at least one of the following modes:

Mode 1: the image contains four types of decoding blocks: Class 1, Class 2, Class 3 and Class 4;

Mode 2: the image contains three types of decoding blocks: Class 1, Class 2 and Class 3;

Mode 3: the image contains three types of decoding blocks: Class 1, Class 2 and Class 4;

Mode 4: the image contains three types of decoding blocks: Class 1, Class 3 and Class 4;

Mode 5: the image contains three types of decoding blocks: Class 2, Class 3 and Class 4;

Modes 6 to 11: the image contains two types of decoding blocks: any two of Class 1, Class 2, Class 3 and Class 4; and Modes 12 to 15: the image contains a type of decoding blocks: any one of Class 1, Class 2, Class 3 and Class 4.

The types of decoding blocks include:

Class 1: decoding blocks using palette decoding, string copy decoding and rectangle copy decoding;

Class 2: decoding blocks using string copy decoding and rectangle copy decoding;

Class 3: decoding blocks using palette decoding and string copy decoding; and

Class 4: decoding blocks using palette decoding and rectangle copy decoding.

The parsing module is further configured to obtain decoding block mode information in the sequence layer information unit corresponding to a video sequence in which the decoding block is located, herein the decoding block mode information includes at least one of the following modes:

Mode 1: the video sequence contains four types of decoding blocks: Class 1, Class 2, Class 3 and Class 4;

Mode 2: the video sequence contains three types of decoding blocks: Class 1, Class 2 and Class 3;

Mode 3: the video sequence contains three types of decoding blocks: Class 1, Class 2 and Class 4;

Mode 4: the video sequence contains three types of decoding blocks: Class 1, Class 3 and Class 4;

Mode 5: the video sequence contains three types of decoding blocks: Class 2, Class 3 and Class 4;

Modes 6 to 11: the video sequence contains two types of decoding blocks: any two of Class 1, Class 2, Class 3 and Class 4; and Modes 12 to 15: the video sequence contains a type of decoding blocks: any one of Class 1, Class 2, Class 3 and Class 4.

The types of decoding blocks include:

Class 1: decoding blocks using palette decoding, string copy decoding and rectangle copy decoding;

Class 2: decoding blocks using string copy decoding and rectangle copy decoding;

Class 3: decoding blocks using palette decoding and string copy decoding; and

Class 4: decoding blocks using palette decoding and rectangle copy decoding.

The pixel sample segments include one of the following: a pixel, a pixel component, and a pixel index.

The obtained parameters of the pixel sample segments are consisted of multiple sub-parameter fields, input bits of sub-parameter fields of the same type of the obtained parameters are obtained in one or more connecting fields in a bitstream, or are obtained in different fields in a bitstream.

The sub-parameter fields of the obtained parameters of the pixel sample segments include a single-component sub-parameter field, a two-component sub-parameter field or a three-component sub-parameter field.

The sub-parameter fields of the decoded parameters include at least one of the following sub-parameter fields:

Sub-parameter field 1: a decoding mode type; the coding mode type include any one of the following types: palette decoding, block copy decoding, micro-block copy decoding, line copy decoding, string copy decoding, rectangle copy decoding, and pixel copy decoding without reference;

Sub-parameter field 2: an index or copy position;

Sub-parameter field 3: an index length or copy size; and

Sub-parameter field 4: a pixel sample value without reference.

The parsing module is configured to parse the bitstream of the decoding block and determine the decoding modes of the pixel sample segments of the decoding block by the following way:

decoding information fields of the decoded pixel sample segments into a bitstream of the decoding block, herein the bitstream includes one or more of the following information fields:

Information field 1: a decoding mode used by the decoding block;

Information field 2: a copy path shape mode;

Information field 3: a pixel sample value arrangement;

Information field 4: a parameter decoding mode list corresponding to the information field;

Information field 5: header information for palette decoding, including the number of pixels in the palette and values of the pixels or reuse rules;

Information field 6: containing at least one of the following information: a palette decoding or copy decoding indication bits corresponding to the pixel sample segment, a sample subset number corresponding to the pixel sample segment or empty, an index or copy position corresponding to the pixel sample segment, an index length or copy size corresponding to the pixel sample segment, and a pixel sample value without reference corresponding to the pixel sample segment pixel sample value or empty; and Information field 7: a copy residual or empty.

Figure 5:
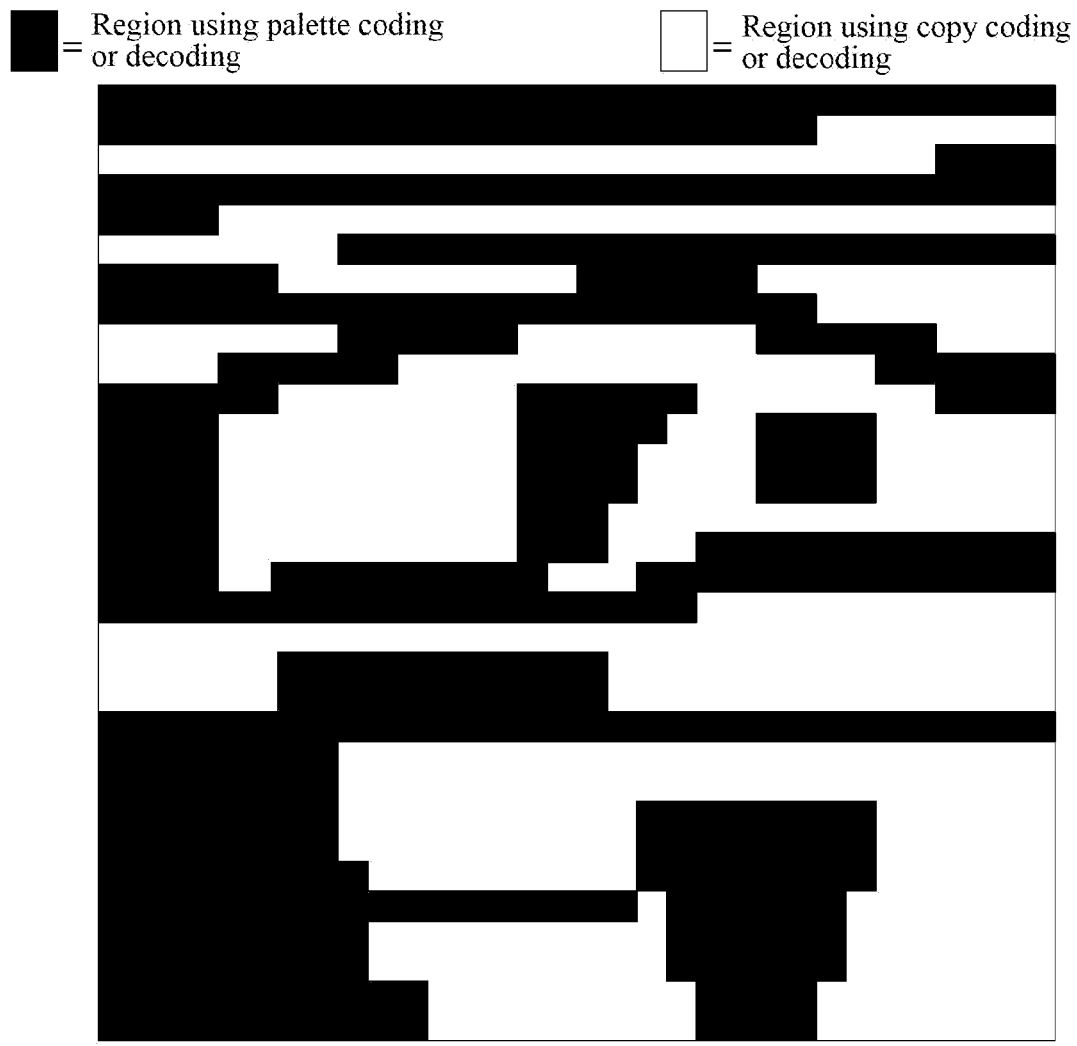
FIG. 5 is a schematic diagram of a coding block (decoding block) for performing hybrid coding in accordance with an embodiment of the present disclosure.

As shown in FIG. 5, in an embodiment of the present disclosure, a palette coding (or a corresponding decoding) mode is mixed with a copy coding (or a corresponding decoding) mode in a coding block or a decoding block, that is, a portion of pixels in a coding block (decoding block) are coded or decoded using palette and index modes, while another portion of the pixels is coded or decoded using a pixel copy mode.

A coder writes syntax elements required for palette decoding generated by palette coding and syntax elements required for copy coding generated by the copy coding into a bitstream segment of a CU, to generate bitstream data of the CU. A decoder obtains the syntax elements of the palette decoding from the bitstream data of the CU, each type of palette decoding parameters, the syntax elements of copy decoding, and each type of copy decoding parameters, and performs the palette decoding and the copy decoding according to the palette decoding parameters and the copy decoding parameters respectively, to generate all the reconstructed pixels of the current decoded CU with the palette mode reconstructed pixels being mixed with the copy mode reconstructed pixels.

In the coding method and apparatus in accordance with the embodiments of the present disclosure, a palette is first constructed when the current coding block is coded, and then portion or all of pixels of the current coding block are represented by an index of the palette, an index typically occupies less bits than a pixel; coding operation, including run-length coding and/or entropy coding, is performed on a portion of the pixels of the current coding block using palette mode and index mode; for another portion of the pixels of the current coding block, one or more optimal copy reference stings (reference strings for short) and/or copy reference rectangles (reference rectangles for short) and/or copy reference micro-blocks (reference micro-blocks for short) and/or copy reference lines (reference lines for short) is/are obtained by searching in a pre-specified search window range within a set of reconstructed reference pixel samples or original input images. Results of the palette coding are represented by one or more palette parameters related to the palette decoding. The reference strings, the reference rectangles, the reference micro-blocks, the reference lines are represented by one or more copy parameters (or called matching parameters) related to string copy decoding, rectangle copy decoding, micro-block copy decoding and line copy decoding. Parameters required for decoding, including portion or all of the pixels of the palette, palette parameters, and copy parameters, are mixed and placed into the bitstream.

In the coding method and apparatus in accordance with the embodiments of the present disclosure, portion or all of the pixels of the palette are obtained from the bitstream when the current decoding block is decoded, and the palette parameters related to the palette decoding and the copy parameters related to the copy decoding are obtained. Decoding, including index run decoding, is performed according to portion or all of the palette parameters to obtain indexes of portion of the pixels of the current decoding block and use the indexes to obtain the corresponding pixel samples from the palette, and values of the pixel samples are assigned to the current decoded pixels directly or indirectly. The reference string and/or reference rectangle and/or reference micro-block and/or reference line is/are obtained from the set of the reconstructed reference pixel samples based on portion or all of the copy parameters, and its/their value/values is/are assigned directly or indirectly to the current decoding string (current string for short) and/or the current decoding rectangle (current rectangle for short) and/or the current decoded micro-block (current micro-block for short) and/or the current decoding line (current line for short).

Palette parameters include: index, a length of an index run (i.e., index string) for copying a left index, and a length of an index run (i.e., index string) for copying an upper index.

The copy parameters include a copy position and/or a copy size. For the reference strings, the copy size includes a copy length. For the reference rectangles, the copy size includes two copy parameter components, a copy width and a copy length; or two copy parameter components, a copy height and a copy length; or two copy parameter components, a copy width and a copy height.

The copy position is a linear (1-dimensional) distance or planar (2-dimensional) distance between the first pixel sample value of the reference string and/or reference rectangle and/or reference micro-block and/or reference line in the set of the reconstructed reference pixel samples and the first pixel sample value of the current string and/or current rectangle and/or current micro-block and/or current line, the unit of which is a sample value or a number of samples. The copy position is sometimes referred to as a intra-frame motion vector.

For the reference string and/or reference rectangle, the copy size is the size of the reference string and/or the reference rectangle, and its unit is also a sample value or a number of samples. Obviously, the size of the reference string and/or reference rectangle is also the size of the current string and/or the current rectangle.

An alternative decoding process with the palette decoding and the copy decoding being mixed is a decoding process in which the following statements or equivalent statements are executed or repeated:

Mode indication bits of a palette/copy type (i.e., a decoding mode) are obtained;
If the palette/copy type is a palette, then
{
one or more indexes of an index run is/are decoded and obtained
the index/indexes is/are used to assign values of corresponding pixels in the palette directly or indirectly to one or more of the current decoded pixels
}
If the palette/copy type is string copy, then
{
copy position and copy size of a reference string are decoded
a value of the reference string in the set of the reconstructed reference pixel samples specified by the copy position and the copy size is assigned to the current decoding string directly or indirectly
}
If the palette/copy type is rectangle copy, then
{
copy position and copy size of a reference rectangle are decoded
a value of the reference rectangle in the set of the reconstructed reference pixel samples specified by the copy position and the copy size is assigned to the current decoding string directly or indirectly
}
If the palette/copy type is pixel without reference, then
{
a value of the pixel without reference obtained from a bitstream is directly or indirectly assigned to the current decoded pixel
}
In addition to the above cases,
{
other decoding operations are performed
}

The pixel samples in the set of the reconstructed reference pixel samples can be equivalent to the reconstructed samples or can be various variants of the reconstructed samples, such as samples processed by pixel clustering, color quantization, numerical quantization, vector quantization, de-noising, filtering, feature extraction, etc., or samples processed by color format conversion, permutation transformation, frequency domain conversion, spatial domain mapping, DPCM, first order or higher order differential operation, indexing, or the like, or variants of pixel values which are multi-processed or multi-transformed. When the reference samples are not equivalent to the reconstructed samples, the reference samples can be stored temporarily after generated at one time for multiple uses later when needed, or can be generated immediately whenever needed, or can be a combination of the above two.

In the embodiments of the present disclosure, "the reconstructed samples" and "the reference samples" are sometimes collectively referred to as "the reconstructed reference pixel samples". Depending on the context, it can be determined whether the "the reconstructed reference pixel samples" represent either "the reconstructed samples" or "the reference samples" or any of the two.

In the embodiments of the present disclosure, "the set of the reconstructed reference samples" and "the set of the reconstructed reference pixel samples" are synonyms and are sometimes referred to as "the set of samples" in the absence of confusion.

The set of the reconstructed reference pixel samples may be a two-dimensional region containing at least one CTU region and connected into one, or may be composed of multiple uncorrelated partial regions or pixels selected according to a predetermined rule.

For the set of the reconstructed reference pixel samples containing at least one CTU region and/or the current CU, the string copy coding or decoding has at least four basic copy path shape modes in terms of path shapes of the reference string and/or the current string.

A basic copy path shape mode 1 is a copy path shape mode of vertical path 1-dimensional string copy. In this copy path shape mode, the set of the reconstructed reference pixel samples and/or the current CU are arranged in an order of a CTU sequence number or a CU sequence number, and in a CTU or CU, the samples are arranged column by column, the samples in each column are scanned and arranged vertical from top to bottom. In this way, the set of the reconstructed reference pixel samples is also arranged into a sting of one-dimensional samples.

A basic copy path shape mode 2 is a copy path shape mode of horizontal path 1 dimensional string copy. The basic copy path shape mode 2 is a dual mode of the basic copy path shape mode 1 described above. The "vertical" in the basic copy path shape mode 1 is replaced with "horizontal", "column" is replaced with "row", and "top to bottom" is replaced with "left to right" to obtain the basic copy path shape mode 2.

A basic copy path shape mode 3 is a copy path shape mode of vertical path 2-dimensional conformal copy. In this copy path shape mode, the set of the reconstructed reference pixel samples retain 2-dimensional arrangement inherent in the original image plane, and in the current CU, the samples are arranged in a vertical scanning manner column by column and are arranged in one column from top to bottom. When a reference string is searched or copied in the set of the reconstructed reference pixel samples, the current samples are scanned vertically from top to bottom in the current CU, and after a column of samples are scanned and copied, a column adjacent to it on the right is scanned and copied. The two-dimensional shape and the path direction of the scan mode of the reference string found in the set of the reconstructed reference pixel samples must be kept the same as those of the current string in the current CU. Heights of two-dimensional regions formed by the reference string and the current string respectively are equal to the height of the current coding block or decoding block.

A basic copy path shape mode 4 is a copy path shape mode of horizontal path 2-dimensional conformal copy. The basic copy path shape mode 4 is a dual mode of the basic copy path shape mode 3 described above. In this copy path shape mode, the set of the reconstructed reference pixel samples retain 2-dimensional arrangement inherent in the original image plane, and in the current CU, the samples are arranged in a horizontal scanning manner row by row and are arranged in one column from left to right. When a reference string is searched or copied in the set of the reconstructed reference pixel samples, the current samples are scanned horizontally from left to right in the current CU, and after a row of samples are scanned and copied, a column adjacent to it below is scanned and copied. The two-dimensional shape and the path direction of the scan mode of the reference string found in the set of the reconstructed reference pixel samples must be kept the same as those of the current string in the current CU. Widths of two-dimensional regions formed by the reference string and the current string respectively are equal to the width of the current coding block or decoding block.

Various other copy path shape modes can be derived from the four types of basic copy path shape modes described above, including:

1) A copy path shape mode which is almost the same as the basic copy path shape mode 1 with scan path directions alternating, that is, the scan mode is that odd columns are scanned from top to bottom and even columns are scanned from bottom to top;

2) A copy path shape mode which is almost the same as the basic copy path shape mode 1 with scan path directions alternating, that is, the scan mode is that even columns are scanned from top to bottom and odd columns are scanned from bottom to top;

3) A copy path shape mode which is almost the same as the basic copy path shape mode 2 with scan path directions alternating, that is, the scan mode is that odd rows are scanned from left to right and even rows are scanned from right to left;

4) A copy path shape mode which is almost the same as the basic copy path shape mode 2 with scan path directions alternating, that is, the scan mode is that even rows are scanned from left to right and odd rows are scanned from right to left;

5) A copy path shape mode which is almost the same as the basic copy path shape mode 3 with scan path directions alternating, that is, the scan mode is that odd columns are scanned from top to bottom and even columns are scanned from bottom to top;

6) A copy path shape mode which is almost the same as the basic copy path shape mode 3 with scan path directions alternating, that is, the scan mode is that even columns are scanned from top to bottom and odd columns are scanned from bottom to top;

7) A copy path shape mode which is almost the same as the basic copy path shape mode 4 with scan path directions alternating, that is, the scan mode is that odd rows are scanned from left to right and even rows are scanned from right to left; and 8) A copy path shape mode which is almost the same as the basic copy path shape mode 8 with scan path directions alternating, that is, the scan mode is that even rows are scanned from left to right and odd rows are scanned from right to left.

The widths of the reference string and the current string are 1, 2, 3, . . . , W samples.

When the copy coding or decoding uses a horizontal or vertical scan path shape mode, the index or index run for the palette coding or decoding mixing with the copy coding or decoding also uses the same horizontal or vertical scan path shape mode.

In the decoding method and apparatus in accordance with the embodiments of the present disclosure, when bitstream data of the current decoding block are parsed, the copy path shape mode (e.g., one of the copy path shape modes described above) used by the sequence or the image or the CU are parsed out from the bitstream data, and then copy parameters of the index and/or index run and/or reference string and/or reference rectangle and/or reference micro-block and/or reference line are obtained in turn from the bitstream data. After a palette parameter or a copy parameter is obtained, a decoding job is to calculate index/indexes of one or more consecutive positions based on the palette parameters, use the index/indexes to obtain the corresponding pixel samples from the palette and assign values of the pixel samples directly or indirectly to the current decoded pixels of one or more consecutive positions, or calculate the position of the first sample value of the reference string and/or the reference rectangle and/or the reference micro-block and/or the reference line in the set of the reconstructed reference pixel samples from the position of the current decoded sample value and the copy parameter based on the copy path shape mode, and then copy portion or all of the samples of the reference string and/or the reference rectangle and/or the reference micro-block and/or the reference line in the set of the reconstructed reference pixel samples based on the copy path shape mode and the copy parameter, and assign values of the samples directly or indirectly to the current string and/or the current rectangle and/or reference micro-block and/or reference string to restore the current sting and/or current rectangle and/or reference micro-block and/or reference line.

In an image, all CUs can use the same copy path shape mode. Thus, the decoder only needs to parse which copy path shape mode is used by an image from the corresponding set of image parameters or header information of the image without the need for each CU to parse which copy path shape mode is used by the CU. The coder also only needs to write the copy path shape mode directly or indirectly into the corresponding set of image parameters or header information of an image. In a video sequence, all images and all CUs can use the same copy path shape mode. Thus, the decoder only needs to parse from the corresponding set of sequence parameters or header information of a sequence which copy path shape mode is used by the sequence without the need for each image and each CU to parse which copy path shape mode is used by the image and the CU. The coder also only needs to write the copy path shape mode directly or indirectly into the corresponding set of sequence parameters or header information of a sequence. Some CUs can also be subdivided into a number of sub-regions (such as PUs), each sub-region (such as PU) using a different copy path shape mode.

In bitstream data of a CU or a sub-region of a CU, there exist mixedly palette parameters and a variety of copy parameters, collectively referred to as palette/copy parameters: palette parameters, copy parameters of the reference string, copy parameters of the reference rectangle, copy parameters of the reference micro-block, and copy parameters of the reference line. There is one direct (including in the bitstream) or indirect (including obtaining from other information in the coding or decoding process) mode indication bits in front of each of one or more palette/copy parameters in the bitstream data, which are used to directly or indirectly indicate whether the subsequent palette/copy parameters are the palette parameters or the copy parameters of the reference string or the copy parameters of the reference rectangle or the copy parameters of the micro-blocks or the copy parameters of the reference line.

In an alternative scheme, in bitstream data of a CU or a sub-region of a CU, there exist mixedly three types of palette/copy parameters: palette parameters, copy parameters of the reference string and copy parameters of the reference rectangle. There is one direct (including in the bitstream) or indirect (including obtaining from other information in the coding or decoding process) mode indication bits in front of each of one or more palette/copy parameters in the bitstream data, which are used to directly or indirectly indicate whether the subsequent palette/copy parameters are the palette parameters or the copy parameters of the reference string or the copy parameters of the reference rectangle.

In an alternative scheme, in bitstream data of a CU or a sub-region of a CU, there exist mixedly two types of palette/copy parameters: palette parameters and copy parameters of the reference string. There is one direct (including in the bitstream) or indirect (including obtaining from other information in the coding or decoding process) mode indication bits in front of each of one or more palette/copy parameters in the bitstream data, which are used to directly or indirectly indicate whether the subsequent palette/copy parameters are the palette parameters or the copy parameters of the reference string.

In an alternative scheme, in bitstream data of a CU or a sub-region of a CU, there exist mixedly two types of palette/copy parameters: palette parameters and copy parameters of the reference rectangle. There is one direct (including in the bitstream) or indirect (including obtaining from other information in the coding or decoding process) mode indication bits in front of each of one or more palette/copy parameters in the bitstream data, which are used to directly or indirectly indicate whether the subsequent palette/copy parameters are the palette parameters or the copy parameters of the reference rectangle.

In the bitstream data of an image, there is one or two or three or four of the following four classes of CUs or sub-regions of CU:

Class 1: a CU or a sub-region of a CU in which three types of palette/copy parameters, i.e. palette parameters, copy parameters of the reference string and copy parameters of the reference rectangle, are mixed;

Class 2: a CU or a sub-region of a CU in which two types of palette/copy parameters, i.e. palette parameters and copy parameters of the reference rectangle, are mixed;

Class 3: a CU or a sub-region of a CU in which two types of palette/copy parameters, i.e. palette parameters and copy parameters of the reference string, are mixed; and Class 4: a CU or a sub-region of a CU in which two types of palette/copy parameters, i.e. palette parameters and copy parameters of the reference rectangle, are mixed.

In the corresponding set of image parameters or image header information of an image and its bitstream data, a direct or indirect mode indication bits are used to indicate directly or indirectly one of the following cases:

Case 1: the four classes of CUs or sub-regions of CU described above, i.e. CUs or sub-regions of CU of Class 1, Class 2, Class 3 and Class 4 exist in the current image and its bitstream data;

Case 2: three classes of the four classes of CUs or sub-regions of CU described above, i.e. CUs or sub-regions of CU of Class 1, Class 2 and Class 3, exist in the current image and its bitstream data;

Case 3: three classes of the four classes of CUs or sub-regions of CU described above, i.e. CUs or sub-regions of CU of Class 1, Class 2 and Class 4, exist in the current image and its bitstream data;

Case 4: three classes of the four classes of CUs or sub-regions of CU described above, i.e. CUs or sub-regions of CU of Class 1, Class 3 and Class 4, exist in the current image and its bitstream data;

Case 5: three classes of the four classes of CUs or sub-regions of CU described above, i.e. CUs or sub-regions of CU of Class 2, Class 3 and Class 4, exist in the current image and its bitstream data;

Case 6: two classes of the four classes of CUs or sub-regions of CU described above, such as CUs or sub-regions of CU of Class 1 and Class 3, or CUs or sub-regions of CU of Class 2 and Class 3, exist in the current image and its bitstream data; and Case 7: one class of the four classes of CUs or sub-regions of CU described above, such as CUs or sub-regions of CU of Class 1, CUs or sub-regions of CU of Class 2, CUs or sub-regions of CU of Class 3, or CUs or sub-regions of CU of Class 4, exist in the current image and its bitstream data.

In the corresponding set of sequence parameters or sequence header information of an image and its bitstream data, a direct or indirect mode indication bits are used to indicate directly or indirectly one of the following cases:

Case 8: the four classes of CUs or sub-regions of CU described above, i.e. CUs or sub-regions of CU of Class 1, Class, Class 3 and Class 4, exist in the current sequence and its bitstream data;

Case 9: three classes of the four classes of CUs or sub-regions of CU described above, i.e. CUs or sub-regions of CU of Class 1,Class 2 and Class 3,exist in the current sequence and its bitstream data;

Case 10: three classes of the four classes of CUs or sub-regions of CU described above, i.e. CUs or sub-regions of CU of Class 1, Class 2 and Class 4, exist in the current sequence and its bitstream data;

Case 11: three classes of the four classes of CUs or sub-regions of CU described above, i.e. CUs or sub-regions of CU of Class 1, Class 3 and Class 4, exist in the current sequence and its bitstream data;

Case 12: three classes of the four classes of CUs or sub-regions of CU described above, i.e. CUs or sub-regions of CU of Class 2, Class 3 and Class 4, exist in the current sequence and its bitstream data;

Case 13: two classes of the four classes of CUs or sub-regions of CU described above, such as CUs or sub-regions of CU of Class 1 and Class 3, or CUs or sub-regions of CU of Class 2 and Class 3, exist in the current sequence and its bitstream data; and Case 14: one class of the four classes of CUs or sub-regions of CU described above, such as CUs or sub-regions of CU of Class 1, CUs or sub-regions of CU of Class 2, CUs or sub-regions of CU of Class 3, or CUs or sub-regions of CU of Class 4, exist in the current sequence and its bitstream data.

Technical features of the embodiments of the present disclosure have been described above by several specific examples. Other advantages and effects of the embodiments of the present disclosure will be readily understood by those skilled in the art from contents disclosed in this specification. The present disclosure may also be practiced or applied by further different specific embodiments, and each detail in this specification may be modified or altered based on different views and applications without departing from the rule of the invention.

Terms used in the embodiments of the present disclosure may also be represented by other terms from physics or mathematics, for example, copy position may also be called one of the following: matching position, position, distance, relative distance, displacement amount, displacement vector, movement amount, motion vector, offset, offset vector, block vector, string vector, compensation amount, compensation, linear address, address, 2-dimensional coordinate, 1-dimensional coordinate, coordinate, index, index number, and so on. Copy length can also be called one of the following: copy stroke, the number of copies, copy count, copy run, matching stroke, the number of matches, match count, match run, length, stroke, number, count, run, etc. String copy is also known as string matching, rectangle copy is also known as rectangle matching, and point copy is also known as point matching, and so on.

An alternative coding method in accordance with an embodiment of the present disclosure includes all or part of the following steps.

1) Pixels of a coding block are coded mixedly using palette and/or string copy and/or rectangle copy to generate palette parameters and/or copy parameters of a reference string and/or copy parameters of a reference rectangle and/or pixel samples without reference.

2) Other steps for coding, reconstructing and generating video bitstream data, in which other coding and reconstruction operations are performed on the coding block, and coding and reconstruction operations, and entropy coding operations of various commonly used techniques, such as intra-frame prediction, inter-frame prediction, block copy, micro-block copy, line copy, transformation, quantization, inverse transformation, inverse quantization, compensation corresponding to prediction residuals and copy residuals (i.e., inverse operations of residual calculation), prediction and residual calculation, DPCM, first order and higher order difference, mapping, run, index, deblocking filtering, sample adaptive offset, are performed on the input pixels, various parameters and variables; the output of this step is the reconstructed pixels (including the completely reconstructed pixels and the partially reconstructed pixels in varying degrees) and a video bitstream containing coding results with palette and/or string copy and/or rectangle copy being mixed and other coding results; the video bitstream is the output of this coding method, which contains all syntax elements required to perform decoding and reconstruction using the corresponding decoding modes, including syntax elements of the palette parameters and/or the copy parameters of the reference sting and/or the copy parameters of the reference rectangle for the coding with the palette and/or string copy and/or rectangle copy being mixed, and/or syntax elements of the pixel samples without reference.

An alternative coding method in accordance with an embodiment of the present disclosure includes all or part of the following steps:

1) A bitstream is parsed to obtain decoding parameters and variables, including palette parameters and/or copy parameters of a reference sting and/or copy parameters of a reference rectangle and/or pixel samples without reference.

2) Decoding is performed with palette and/or string copy and/or rectangle copy being mixed using the obtained palette parameters and/or copy parameters of the reference sting and/or copy parameters of the reference rectangle and/or pixel samples without reference.

An alternative coding apparatus in accordance with an embodiment of the present disclosure includes all or part of the following modules.

1) A search and coding module with palette and/or string copy and/or rectangle copy being mixed, configured to perform palette and copy coding on the input pixel samples with the palette and/or string copy and/or rectangle copy being mixed, perform run coding on indexes, search for the optimal reference string and/or the optimal reference rectangle for the pixels in a set of the reconstructed reference pixel samples and generate palette parameters and/or copy parameters of a reference sting and/or copy parameters of a reference rectangle and/or pixel samples without reference.

2) A reconstructing reference pixel sample set module, configured to temporarily store the reconstructed pixel samples and reference pixel samples which are used as reference pixel samples in search, coding and reconstruction for subsequent coding, including block copy coding, micro-block copy coding, line copy coding, string copy coding, rectangle copy coding, copy coding with multiple types of copy modes being mixed, predictive coding; herein the input of the set of the reconstructed reference pixel samples is the reconstructed samples, and the output is reference samples, which can be equivalent to the reconstructed samples or can be various variants of the reconstructed samples, such as samples processed by pixel clustering, color quantization, numerical quantization, vector quantization, de-noising, filtering, feature extraction, etc., or samples processed by color format conversion, permutation transformation, frequency domain conversion, spatial domain mapping, DPCM, first order or higher order differential operation, indexing, or the like, or variants of pixel values which are multi-processed or multi-transformed, when the reference samples are not equivalent to the reconstructed samples, the reference samples can be stored temporarily after generated at one time for multiple uses later when needed, or can be generated immediately whenever needed, or can be a combination of the above two.

3) A palette module, configured to temporarily store a number of pixels, that is, palette pixels.

4) Other module(s) for coding, reconstructing and generating video bitstream data, configured to perform other coding and reconstruction operations, and perform coding and reconstruction operations, and entropy coding operations of various commonly used techniques, such as intra-frame prediction, inter-frame prediction, block copy, micro-block copy, line copy, transformation, quantization, inverse transformation, inverse quantization, compensation corresponding to prediction residuals and copy residuals (i.e., inverse operations of residual calculation), prediction and residual calculation, DPCM, first order and higher order difference, mapping, run, index, deblocking filtering, sample adaptive offset, on the input pixels, various parameters and variables; herein the output of this step is the reconstructed pixels (including the completely reconstructed pixels and the partially reconstructed pixels in varying degrees) and a video bitstream containing coding results with palette and/or string copy and/or rectangle copy being mixed and other coding results; the video bitstream is the output of this coding method, which contains all syntax elements required to perform decoding and reconstruction using the corresponding decoding modes, including syntax elements of the palette parameters and/or the copy parameters of the reference sting and/or the copy parameters of the reference rectangle for the coding with the palette and/or string copy and/or rectangle copy being mixed and/or syntax elements of the pixel samples without reference and/or syntax elements of other copy parameters and/or syntax elements of other coding parameters.

An alternative decoding apparatus in accordance with an embodiment of the present disclosure includes all or part of the following modules.

1) A module for parsing a bitstream, obtaining palette parameters, copy parameters, pixel samples without reference, and so on, performing bitstream analysis on the input bitstream data, and obtaining decoding parameters and variables, including the palette parameters and/or copy parameters of a reference string and/or copy parameters of a reference rectangle and/or pixel samples without reference and/or other copy parameters of other copy decoding modes and/or other decoding parameters and variables.

2) A copy decoding module with palette/string copy/rectangle copy being mixed, configured to perform decoding operation with palette/string copy/rectangle copy being mixed on the palette parameters and/or the copy parameters of the reference string and/or the copy parameters of the reference rectangle and/or the pixel samples without reference obtained from the bitstream, that is, according to a known copy path shape mode, in the case of the reference string and/or the reference rectangle, assign values of the pixel samples of the reference string and/or the reference rectangle in positions specified by the copy parameter of the reference string and/or the copy parameter of the reference rectangle (including copy positions) in the set of the reconstructed reference pixel samples, sizes of which are also specified by the copy parameter of the reference string and/or the copy parameter of the reference rectangle (including the copy size), to the current string and/or current rectangle directly or indirectly; and in the case of a palette, perform an operation including run decoding to obtain one or more indexes and assign values of the pixels of the palette directly or indirectly to one or more current decoded pixels according to the indexes.

3A reconstructing reference pixel sample set module, configured to temporarily store the reconstructed pixel samples and reference pixel samples which are used as reference pixel samples in decoding and reconstruction for subsequent decoding, including block copy decoding, micro-block copy decoding, line copy decoding, string copy decoding, rectangle copy decoding, copy decoding with multiple types of copy modes being mixed, predictive decoding; herein the input of the set of the reconstructed reference pixel samples is the reconstructed samples, and the output is reference samples, which can be equivalent to the reconstructed samples or can be various variants of the reconstructed samples, such as samples processed by pixel clustering, color quantization, numerical quantization, vector quantization, de-noising, filtering, feature extraction, etc., or samples processed by color format conversion, permutation transformation, frequency domain conversion, spatial domain mapping, DPCM, first order or higher order differential operation, indexing, or the like, or variants of pixel values which are multi-processed or multi-transformed, when the reference samples are not equivalent to the reconstructed samples, the reference samples can be stored temporarily after generated at one time for multiple uses later when needed, or can be generated immediately whenever needed, or can be a combination of above two.

4) A palette module for temporarily storing a number of pixels, that is, palette pixels.

The following are more implementation details and variations of the embodiments of the present disclosure.

The embodiments of the present disclosure are applicable to coding and decoding of images in a stacked packet format. Pixels of the current CU and pixels of a set of the reconstructed reference pixel samples are arranged in the stacked packet format. Reference blocks, reference micro-blocks, reference strings, reference rectangles, reference points and current blocks, current micro-blocks, current strings, current rectangles and current points are all arranged in the stacked packet format, i.e., arranged by taking a single pixel, formed by three component samples stacked separately crosswise, as a unit, to form a set of samples of three component samples arranged separately crosswise. Reference blocks, reference micro-blocks, reference lines, reference strings, reference rectangles, etc., are searched or copied in such set of the reconstructed reference pixel samples.

The embodiments of the present disclosure are equally applicable to coding and decoding of images in a component planar format. Pixels of the current CU and pixels of a set of the reconstructed reference pixel samples are decomposed into three component planes, one component of all the pixels forming a plane. All reference blocks, reference micro-blocks, reference strings, reference rectangles, reference points and current blocks, current micro-blocks, current strings, current rectangles and current points are decomposed into three component planes, one component of all the pixels forming a plane. Each of a reference block, a reference micro-block, a reference string, a reference rectangle, a reference point and a current block, a current micro-block, a current string, a current rectangle and a current point contains only a sample of one component. Block copy, micro-block copy, line copy, string copy, rectangle copy and point copy are all carried out in 3 planes respectively. However, in order to reduce the copy parameters, and because the three planes have great correlation, the three planes share the same copy parameters.

If the copy coding and decoding of the images in the component planar format in accordance with the embodiments of the present disclosure are applied to the case where chroma components U and V are down-sampled in a YUV 4:2:2 pixel color format and a YUV 4:2:0 pixel color format, then when copy parameters of the Y-plane are applied to the U-plane and the V-plane, the copy parameters are required to be changed and adjusted accordingly based on the proportion of the downsampling.

The set of the reconstructed reference pixel samples can be divided into several subsets, and pixels of the subset can have different component arrangements, color formats and pixel sample arrangements.

The set of the reconstructed reference pixel samples can be divided into several subsets, and pixels of the subset can also be the completely reconstructed pixels or the staged reconstructed pixels in reconstruction stages of varying degrees specific to the pixels.

1) Implementation and variant example 1: an alternative embodiment 1 of mixing palette and copy modes In bitstream data of a coding block or decoding block or PU or CU or CTU or LCU, there exist mixedly three types of palette/copy parameters: palette parameters, copy parameters of the reference string and copy parameters of the reference rectangle; and hybrid coding or decoding of three types of palette/copy modes, palette, string copy, rectangle copy, is performed.

2) Implementation and variant example 2: an alternative embodiment 2 of mixing palette and copy modes In bitstream data of a coding block or decoding block or PU or CU or CTU or LCU, there exist mixedly two types of palette/copy parameters: palette parameters, copy parameters of the reference string; and hybrid coding or decoding of two types of palette/copy modes, palette and string copy, is performed.

3) Implementation and variant example 3: an alternative embodiment of an order by which syntax elements of palette parameters and copy parameters, collectively referred to as palette/copy parameters, are placed in a bitstream The order by which the syntax elements (the syntax elements are shown in bold) of the palette/copy parameters are placed in the bitstream is recorded to be:

palette/copy parameter 1, palette/copy parameter 2, palette/copy parameter 3 , . . . , palette/copy parameter i, complex palette/system parameter i+1, . . .

4) Implementation and variant example 4: an alternative embodiment of a composition field of palette/copy parameters The palette/copy parameters consist of a number of palette/copy sub-parameter fields, the palette/copy sub-parameter fields include:

Palette/copy sub-parameter field 1: palette/copy type that indicates whether the palette/copy mode is palette or string copy or rectangle copy or micro-block copy or line copy or pixel copy without reference;

Palette/copy sub-parameter field 2: index or copy position that indicates the palette index or the position of reference pixel in the set of the reconstructed reference pixel samples;

Palette/copy sub-parameter field 3: copy size that indicates the length of an index run or the number of pixels in the current string or the current rectangle; and Palette/copy sub-parameter field 4: pixel without reference indicating pixel values without reference.

In a palette/copy parameter, some palette/copy sub-parameter fields can be empty.

5) Implementation and variant example 5: an alternative embodiment of a presentation format of syntax elements of a composition field of palette/copy parameters in the bitstream Bitstream data includes direct or indirect representations (examples of the indirect representations: representations after first order or higher order differential coding and/or predictive coding and/or matching coding and/or mapping coding and/or transformation coding and/or quantization coding and/or index coding and/or run-length coding and/or binarization coding and/or entropy coding is/are performed) of the syntax elements of the following palette/copy sub-parameter fields: T 1, P 1, S 1, N 1, T 2, P 2, S 2, N 2 , . . . Ti, Pi, Si, Ni.

Herein Ti, Pi, Si, Ni are a palette/copy type, an index or copy position, a copy size and a pixel without reference of a palette/copy parameter i, respectively; the order by which the syntax elements of the palette/copy sub-parameter field are placed in the bitstream is not unique, any one of predetermined reasonable orders can be used; a syntax element can also be split into several portions, which can be placed centrally in the same place in the bitstream, or can also be placed in different places in the bitstream; a number of syntax elements can also be merged into one syntax element; some syntax elements can also be absent in bitstream data of a palette/copy parameter; some syntax element can be derived from other coding or decoding parameters or variables instead of existing directly in the bitstream data; and multiple syntax elements representing the same palette/copy sub-parameter field can be placed centrally in the same place in the bitstream, for example:

T 1, T 2 . . . . . . Ti . . . . . . P 1, 2 . . . . . . Pi . . . . . . ,
S 1, S 2 . . . . . . Si . . . . . . , N 1. N 2 . . . . . . Ni . . . . . .

or can also be placed in different places in the bitstream, for example:

T 1, P 1, S 1, N 1, T 2, P 2, S 2, N 2, . . . . . . , Ti, Pi, Si, Ni, . . . . . .

or can also be a combination thereof, for example:

T 1, S 1, T 2, S 2 . . . . . . Ti, Si . . . . . . , P 1, P 2 . . . . . . , Pi . . . . . . , N 1, N 2 . . . . . . . Ni . . . . . .

or can also be a mixture of the above-mentioned various placement ways.

6) Implementation and variant example 5: the copy sub-parameter field includes a single-component sub-parameter field or a double-component sub-parameter field or a three-component sub-parameter field.

A copy position Pi or its variant includes a single-component sub-parameter field or a double-component sub-parameter field or a three-component sub-parameter field; syntax elements in a bitstream corresponding to the copy position Pi or its variant include one of the following:

a syntax element corresponding to the copy position Pi or its variant of a reference string: d (one component, such as a position linear address);

or syntax elements corresponding to the copy position Pi or its variant of a reference string: d[0 ] and d[1 ] (two components, such as a position horizontal component, a position vertical component, or a CTU sequence number of a set of the reconstructed reference pixel samples, a position linear address);

or syntax elements corresponding to the copy position Pi or its variant of a reference string: d[0 ], d[1 ] and d[2 ] (three components, such as a CTU sequence number of a set of the reconstructed reference pixel samples, a position horizontal component, a position vertical component).

The copy position Pi or its variant includes a single-component sub-parameter field or a double-component sub-parameter field or a three-component sub-parameter field; syntax elements in a bitstream corresponding to the copy position Pi or its variant include one of the following:

a syntax element corresponding to the copy position Pi or its variant of a reference rectangle: d (one component, such as a position linear address);

or syntax elements corresponding to the copy position Pi or its variant of a reference rectangle: d[0 ] and d[1 ] (two components, such as a position horizontal component, a position vertical component, or a CTU sequence number of a set of the reconstructed reference pixel samples, a position linear address);

or syntax elements corresponding to the copy position Pi or its variant of a reference rectangle: d[0 ], d[1 ] and d[2 ] (three components, such as a CTU sequence number of a set of the reconstructed reference pixel samples, a position horizontal component, a position vertical component).

The copy size Si or its variant includes a single-component sub-parameter field or a double-component sub-parameter field or a three-component sub-parameter field; syntax elements in a bitstream corresponding to the copy size Si or its variant include one of the following:

a syntax element corresponding to the copy size Si or its variant of a reference string: r (one component);

syntax elements corresponding to the copy size Si or its variant of a reference string: r[0 ] and r[1 ] (two components);

or syntax elements corresponding to the copy size Si or its variant of a reference string: r[0 ], r[1 ] and r[2 ] (three components).

The copy size Si or its variant includes a single-component sub-parameter field or a double-component sub-parameter field or a three-component sub-parameter field; syntax elements in a bitstream corresponding to the copy size Si or its variant include one of the following:

a syntax element corresponding to the copy size Si or its variant of a reference rectangle: r (one component);

syntax elements corresponding to the copy size Si or its variant of a reference rectangle: r[0 ] and r[1 ] (two components);

or syntax elements corresponding to the copy size Si or its variant of a reference rectangle: r[0 ], r[1 ] and r[2 ] (three components).

The pixel without reference Ni or its variant includes a single-component sub-parameter field or a double-component sub-parameter field or a three-component sub-parameter field; syntax elements in a bitstream corresponding to the pixel without reference Ni or its variant include one of the following:

a syntax element corresponding to the pixel without reference Ni or its variant: p (one component);

syntax elements corresponding to the pixel without reference Ni or its variant: p[0 ] and p[1 ] (two components);

or syntax elements corresponding to the pixel without reference Ni or its variant: p[0 ], p[1 ] and p[2 ] (three components).

7) Implementation and variant example 7: syntax elements contained in a bitstream Part of bitstream segments of a coding block or decoding block or PU or CU or CTU or LCU of the bitstream includes all or part of syntax elements carrying the following parameters or their variants:

The first type of mode (e.g., coding and decoding mode),
The second type of mode (e.g., copy path shape mode),
The third type of mode (e.g., pixel sample arrangement),
The fourth type of mode (e.g., 2-4 different types of parameter coding modes, different parameter binarization and/or entropy coding modes),
Palette header information (e.g., the number of pixels in the palette and the number of pixels or reuse rules),
Palette/copy mark bit 1, sample subset number 1 or empty, (index or copy position 1, copy size 1 ) or sample 1 without reference or empty,
Palette/copy mark bit 2, sample subset number 2 or empty, (index or copy position 2, copy size 2 ) or sample 2 without reference or empty,
. . .
More palette/copy mark bits, sample subset number or empty, (index or copy position, copy size) or sample without reference or empty,
. . .
Palette/copy mark bit N, sample subset number N or empty, (index or copy position N, copy size N) or sample N without reference or empty,
Copy residual or empty.

The order by which all of the syntax elements are placed in the bitstream is not unique, any one of predetermined reasonable orders can be used; any one of the syntax elements can also be split into several portions, which can be placed centrally in the same place in the bitstream, or can also be placed in different places in the bitstream; a number of syntax elements can also be merged into one syntax element; any one of syntax element can also be absent in the bitstream segments of some coding block or decode block or PU or CU or CTU or LCU.

Parameters, such as the palette/copy mark bit, index or copy position, copy size, and pixel samples without reference, in the bitstream, can be either the parameters themselves, or variants of the parameters coded through various commonly used technologies, such as predictive coding, matching coding, transformation coding, quantization coding, DPCM, first order and higher order differential coding, mapping coding, run-length coding, index coding, etc.

The copy position, the copy size and the pixel without reference may respectively have only one component, or two components, or may be further divided into three components or even more components.

The sample subset number may be part of the copy position, or there is only one subset of samples, at this point, the sample subset number is empty.

8) Implementation and variation example 8: component arrangement formats, color formats, and pixel sample arrangements of a set of the reconstructed reference pixel samples The reconstructed reference pixel samples include the following component arrangement formats, color formats, and pixel sample arrangements:

a stacked packet format, YUV or GBR color format, vertical scan 1-dimensional string arrangement in the LCU or CU, or a stacked packet format, YUV or GBR color format, horizontal scan 1-dimensional string arrangement in the LCU or CU, or a stacked packet format, YUV or GBR color format, 2-dimensional arrangement inherent in an image, or a planar format, YUV or GBR color format, vertical scan 1-dimensional string arrangement in the LCU or CU, or a planar format, YUV or GBR color format, horizontal scan 1-dimensional string arrangement in the LCU or CU, or a planar format, YUV or GBR color format, 2-dimensional arrangement inherent in an image, or empty set.

9) Implementation and variant example 9: examples of a reference string and its copy position and copy length (copy left, copy top)

The reference string and the current string can have overlapping sample positions, that is, a copy position D and a copy length L of the reference string satisfy the following relation: D<L; at this point, L samples of the current string is duplication of D samples between the first sample of the reference string and the first sample of the current string (i.e., D samples prior to the first sample of the current string), that is, When D 32 1<L, the current string is L repeated occurrences of a sample P prior to the first sample (i.e., the current sample) of the current string: PPP . . . PP, that is, L samples of the current string of are all P; this situation is equivalent to L+1 repeated occurrences of the sample P prior to the current sample; if P is in the second reference cache and its copy position in the second reference cache is D 2, then P can be merged with the current string, and is represented by a reference point of point copy with copy position=D 2 and copy size=L+1;

When D=2 <L, and L is an even number, the current string is L/2 repeated occurrences of two samples P1P2 prior to the current sample: P1P2P1P2 . . . P1P2, that is, L samples of the current string are duplications of P1P2;

When D=2 <L, and L is an odd number, the current string is (L−1)/2 repeated occurrences of two samples P1P2 prior to the current sample plus P1:P1P2P1P2 . . . P1P2P1, that is, L samples of the current string are duplications of P1P2 plus P1 at the end;

When D=3 <L, the current string is repeated occurrences of three samples P1P2P3 prior to the current sample until the length reaches L;

When D=4 <L, the current string is repeated occurrences of four samples P1P2P3P4 prior to the current sample until the length reaches L;

When D<L, the current string is repeated occurrences of D samples P1P2 . . . PD−1PD prior to the current sample until the length reaches L;

Or in a CU with the total number of samples in the horizontal (or vertical) direction being X, the reference string is adjacent to and directly above (or directly on the left of) the current string, that is, the copy position of the reference string D=X; when frequency of occurrence of this situation is very high, D=X is represented by a special shorter code and put into a bitstream;

Or in a CU with the total number of samples in the horizontal (or vertical) direction being X, the matching reference string is directly above (or directly on the left of) the current string but not necessarily adjacent to the current string, that is, the copy position of the matching string D=nX; when frequency of occurrence of this situation is very high, D=nX is represented by a number of special shorter codes and put into a bitstream.

10) Implementation and variant example 10: examples that reference pixel samples are variants of the reconstructed pixel samples The reference pixel samples are samples obtained after the reconstructed pixel samples are processed by numerical quantization and inverse quantization operations; or The reference pixel samples are samples obtained after the reconstructed pixel samples are processed by numerical quantization and inverse quantization operations, and will not change after calculating once; or The reference pixel samples are samples obtained after the reconstructed pixel samples are processed by numerical quantization and inverse quantization operations, and the numerical quantization and inverse quantization operations are performed by calculating using coding or decoding quantization parameters; or The reference pixel samples are samples obtained after the reconstructed pixel samples are processed by numerical quantization and inverse quantization operations, and the numerical quantization and inverse quantization operations are performed by calculating using coding or decoding quantization parameters of the CU where the reference pixel samples are located; or The reference pixel samples are samples obtained after the reconstructed pixel samples are processed by numerical quantization and inverse quantization operations, and the numerical quantization and inverse quantization operations are performed by calculating using coding or decoding quantization parameters of the CU where the reference pixel samples are located, and will not change after calculating once; or The reference pixel samples are samples obtained after the reconstructed pixel samples are processed by numerical quantization and inverse quantization operations, and the numerical quantization and inverse quantization operations are performed by calculating using coding or decoding quantization parameters of the current CU; or The reference pixel samples are samples obtained after the reconstructed pixel samples are processed by numerical quantization and inverse quantization operations, and the numerical quantization and inverse quantization operations are performed by calculating using coding or decoding quantization parameters of the current CU, and recalculation will be performed once whenever a CU is coded or decoded; or The reference pixel samples are samples obtained after the reconstructed pixel samples are processed by color quantization; or The reference pixel samples are samples obtained after the reconstructed pixel samples are processed by color quantization, the color quantization is calculated using a palette obtained by color-based pixel clustering; or The reference pixel samples are samples obtained after the reconstructed pixel samples are processed by color quantization, the color quantization is calculated using a palette obtained by color-based pixel clustering related to a coding block or decoding block or PU or CU or CTU or LCU where the reference pixel samples are located; or The reference pixel samples are samples obtained after the reconstructed pixel samples are processed by color quantization, the color quantization is calculated using a palette obtained by color-based pixel clustering related to a coding block or decoding block or PU or CU or CTU or LCU where the reference pixel samples are located, and will not change after calculating once; or The reference pixel samples are samples obtained after the reconstructed pixel samples are processed by color quantization, the color quantization is calculated using a palette with partial contents being dynamically updated obtained by color-based pixel clustering related to a coding block or decoding block or PU or CU or CTU or LCU where the reference pixel samples are located, and will not change after calculating once; or The reference pixel samples are samples obtained after the reconstructed pixel samples are processed by color quantization, the color quantization is calculated using a palette obtained by color-based pixel clustering related to the current coding block or decoding block or PU or CU or CTU or LCU; or The reference pixel samples are samples obtained after the reconstructed pixel samples are processed by color quantization, the color quantization is calculated using a palette obtained by color-based pixel clustering related to the current coding block or decoding block or PU or CU or CTU or LCU, and recalculation will be performed once whenever a coding block or decoding block or PU or CU or CTU or LCU is coded or decoded; or The reference pixel samples are samples obtained after the reconstructed pixel samples are processed by color quantization, the color quantization is calculated using a palette obtained by global color-based pixel clustering.

11) Implementation and variant example 11: Variants of a copy position (difference, etc.) and format ( 1-dimentional or 2-dimentional, etc.)

The samples of the set of the reconstructed reference pixel samples and the samples of the current CU are arranged in a one-dimensional array in a predetermined manner, each sample in the array has a linear address, and the copy position of the current string is a linear address of the first sample of the corresponding reference string minus a linear address of the first sample of the current string; a syntax element corresponding to the copy position in the compressed data bitstream is a syntax element obtained by performing entropy coding on the copy position; the copy position is usually a single-variable parameter, i.e., having only one component; or The samples of the set of the reconstructed reference pixel samples and the samples of the current CU are arranged in a one-dimensional array in a predetermined manner, each sample in the array has a linear address, and the copy position of the current string is a linear address of the first sample of the corresponding reference string minus a linear address of the first sample of the current string; a syntax element corresponding to the copy position in the compressed data bitstream is a syntax element obtained by performing permutation transformation and/or mapping operation and/or string matching coding and/or first order or higher order prediction and differential operation and then performing entropy coding on the copy position and other copy positions; the copy position is usually a single-variable parameter, i.e., having only one component; or The samples of the set of the reconstructed reference pixel samples and the samples of the current CU are arranged in a two-dimensional array in a predetermined manner, each sample in the array has a plane coordinate, and the copy position of the current string is a plane coordinate of the first sample of the corresponding reference string minus a plane coordinate of the first sample of the current string; a syntax element corresponding to the copy position in the compressed data bitstream is a syntax element obtained by performing entropy coding on the copy position; the copy position is usually a double-variable parameter, i.e., having two components; or The samples of the set of the reconstructed reference pixel samples and the samples of the current CU are arranged in a two-dimensional array in a predetermined manner, each sample in the array has a plane coordinate, and the copy position of the current string is a plane coordinate of the first sample of the corresponding reference string minus a plane coordinate of the first sample of the current string; a syntax element corresponding to the copy position in the compressed data bitstream is a syntax element obtained by performing permutation transformation and/or mapping operation and/or string matching coding and/or first order or higher order prediction and differential operation and then performing entropy coding on the copy position and other copy positions; the copy position is usually a double-variable parameter, i.e., having two components; or The samples of the set of the reconstructed reference pixel samples and the samples of the current CU are first partitioned into a number of regions in a predetermined manner, and then the samples in each region are arranged into a two-dimensional array, each sample in the regions and the array has a region number and a plane coordinate, and the copy position of the current string is a region number and a plane coordinate of the first sample of the corresponding reference string minus a region number and a plane coordinate of the first sample of the current string; a syntax element corresponding to the copy position in the compressed data bitstream is a syntax element obtained by performing entropy coding on the copy position; the copy position is usually a three-variable parameter, i.e., having three components; or The samples of the set of the reconstructed reference pixel samples and the samples of the current CU are first partitioned into a number of regions in a predetermined manner, and then the samples in each region are arranged into a two-dimensional array, each sample in the regions and the array has a region number and a plane coordinate, and the copy position of the current string is a region number and a plane coordinate of the first sample of the corresponding reference string minus a region number and a plane coordinate of the first sample of the current string; a syntax element corresponding to the copy position in the compressed data bitstream is a syntax element obtained by performing permutation transformation and/or mapping operation and/or string matching coding and/or first order or higher order prediction and differential operation and then performing entropy coding on the copy position and other copy positions; the copy position is usually a three-variable parameter, i.e., having three components; or The samples of the reconstructed reference pixel sample set and the samples of the current CU are first partitioned into a number of regions in a predetermined manner, and the samples in each region are then arranged in a 1-dimensional array, each sample in the regions and the array has a region number and a plane coordinate, and the copy position of the current string is a region number and a plane coordinate of the first sample of the corresponding reference string minus a region number and a plane coordinate of the first sample of the current string; a syntax element corresponding to the copy position in the compressed data bitstream is a syntax element obtained by performing entropy coding on the copy position; the copy position is usually a double-variable parameter, i.e., having two components; or The samples of the reconstructed reference pixel sample set and the samples of the current CU are first partitioned into a number of regions in a predetermined manner, and the samples in each region are then arranged in a 1-dimensional array, each sample in the regions and the array has a region number and a plane coordinate, and the copy position of the current string is a region number and a plane coordinate of the first sample of the corresponding reference string minus a region number and a plane coordinate of the first sample of the current string; a syntax element corresponding to the copy position in the compressed data bitstream is a syntax element obtained by performing permutation transformation and/or mapping operation and/or string matching coding and/or first order or higher order prediction and differential operation and then performing entropy coding on the copy position and other copy positions; the copy position is usually a double-variable parameter, i.e., having two components.

12) Implementation and variant example 12: variants of a copy length (difference, etc.) and format (single-variable or double-variable, etc.)

The copy length L of the current string is a single-variable parameter; the syntax element corresponding to the copy length in the compressed data bitstream is a syntax element is a syntax element obtained by performing entropy coding on the single-variable parameter of the copy length; or The copy length L of the current string is a single-variable parameter; the syntax element corresponding to the copy length in the compressed data bitstream is a syntax element is a syntax element obtained by performing permutation transformation and/or mapping operation and/or string matching coding and/or first order or higher order prediction and differential operation and then performing entropy coding on the single-variable parameter of the copy length and single-variable parameters of other copy lengths; or The copy length L of the current string is decomposed into a pair of double-variable parameters (k, LL) in the CU with the total number of samples in the horizontal (or vertical) direction being X, where k is a positive integer satisfying $(k-1)X+1 \leq L \leq kX$, and $LL=L-(k-1)X$; a syntax element corresponding to the copy length in the compressed data bitstream is a syntax element obtained by performing entropy coding on the double-variable parameter of the copy length; or The copy length L of the current string is decomposed into a pair of double-variable parameters (k, LL) in the CU with the total number of samples in the horizontal (or vertical) direction being X, where k is a positive integer satisfying $(k-1)X+1 \leq L \leq kX$, and $LL=L-(k-1)X$; a syntax element corresponding to the copy length in the compressed data bitstream is a syntax element obtained by performing permutation transformation and/or mapping operation and/or string matching coding and/or first order or higher order prediction and differential operation and then performing entropy coding on the double-variable parameter of the copy length and double-variable parameters of other copy lengths; or The copy length L of the current string is decomposed into a pair of double-variable parameters (k, LL) with a horizontal (or vertical) distance between its first pixel sample and the right boundary (or the lower boundary) of the current CU being X, where k is a positive integer satisfying $(k-1)X+1 \leq L \leq kX$, and $LL=L-(k-1)X$; a syntax element corresponding to the copy length in the compressed data bitstream is a syntax element obtained by performing entropy coding on the double-variable parameter of the copy length; or The copy length L of the current string is decomposed into a pair of double-variable parameters (k, LL) with a horizontal (or vertical) distance between its first pixel sample and the right boundary (or the lower boundary) of the current CU being X, where k is a positive integer satisfying (k−1)X+1≤L≤kX, and LL=L−(k−1)X; a syntax element corresponding to the copy length in the compressed data bitstream is a syntax element obtained by performing permutation transformation and/or mapping operation and/or string matching coding and/or first order or higher order prediction and differential operation and then performing entropy coding on the double-variable parameter of the copy length and double-variable parameters of other copy lengths.

13) Implementation and variant example 13: Variants of pixels without reference (differential, etc.)

A syntax element corresponding to a pixel without reference in the compressed data bitstream is a syntax element obtained by performing entropy coding on the pixel without reference; or A syntax element corresponding to a pixel without reference in the compressed data bitstream is a syntax element obtained by performing permutation transformation and/or mapping operation and/or string matching coding and/or first order or higher order prediction and differential operation and then performing entropy coding on the pixel without reference and other pixels without reference; or A syntax element corresponding to a pixel without reference in the compressed data bitstream is a syntax element obtained by performing quantization operation and entropy coding on the pixel without reference; or A syntax element corresponding to a pixel without reference in the compressed data bitstream is a syntax element obtained by performing permutation transformation and/or mapping operation and/or string matching coding and/or first order or higher order prediction and differential operation and then performing quantization operation and entropy coding on the pixel without reference and other pixels without reference.

The method and apparatus for processing images provided by the above embodiments can sufficiently exploit and utilize characteristics of each coded image region in the images to improve the image compression effect.

Those ordinarily skilled in the art can understand that all or some of steps of the abovementioned methods may be performed by programs instructing the related hardware, and the programs may be stored in a computer-readable storage medium, such as a read only memory, magnetic or optical disk. Alternatively, all or some of the steps of the abovementioned embodiments may also be implemented by using one or more integrated circuits. Accordingly, the modules/units in the above embodiments may be implemented in the form of hardware, for example, their corresponding functions may be implemented by an integrated circuit, or may be implemented in the form of a software function module. For example, their corresponding functions may be implemented by a processor executing programs/instructions stored in a memory. The present disclosure is not limit to any specific form of the combination of the hardware and software.

It should be noted that, the present disclosure may also have other various embodiments, and without departing from the rule and essence of the present disclosure, those skilled in the art can make various appropriate changes and modifications of the present disclosure, and these appropriate changes and modifications should belong to in the protection scope of the appended claims of the present disclosure.

INDUSTRIAL APPLICABILITY

The technical scheme described above can fully exploit and utilize the characteristics of each coded image region in the image to improve the image compression effect.

We claim:
1. An image coding method comprising:
determining a coding mode of a coding block; and
performing hybrid coding on the coding block using a plurality of coding modes, comprising performing coding on pixel sample segments in the coding block using one of two coding modes which are palette coding and string copy coding,
wherein, the coding block is a coding region of an image, comprising at least one of the following: a largest coding unit, LCU, a coding tree unit, CTU, a coding unit, CU, a sub-region of the CU, a prediction unit, PU, a transform unit, TU, and an asymmetric partition, AMP,
the pixel sample segments comprise any one of the following: a pixel, a pixel component, and a pixel index; wherein
when performing coding on any one of the pixel sample segments in the coding block using palette coding, the method comprises:
constructing or acquiring a palette and performing palette coding on the pixel sample segments to generate palette parameters related to palette decoding;
when performing coding on any one of the pixel sample segments in the coding block using string copy coding, the method comprises:
performing string copy coding on any one of the pixel sample segments to generate copy parameters related to string copy coding, obtaining a string of reference pixel samples matching with the pixel sample segments from a set of the reconstructed reference pixel samples according to a copy path shape mode of the string copy coding of the coding block.

2. The method according to claim 1, wherein
the palette parameters comprise at least one of the following parameters: an index of a palette pixel sample value, a length of an index run for repeating the index, a length of an index run for copying an upper index;
the copy parameters comprise at least one of the following parameters: a copy position and a copy size,
the copy path shape mode of the string copy coding comprises any one of the following modes:
mode 1: vertical path one-dimensional string copy mode, where the string of reference pixel samples and a sting of current pixel samples are strings of one-dimensional samples, the samples are scanned column by column, and the samples in a column are scanned vertically from top to bottom;
mode 2: horizontal path one-dimensional string copy mode, where the string of reference pixel samples and a sting of current pixel samples are strings of one-dimensional samples, the samples are scanned row by row, and the samples in a row are scanned horizontally from left to right;
mode 3: vertical path two-dimensional conformal copy mode, where the string of reference pixel samples and a sting of current pixel samples are strings of two-dimensional samples with a same shape, the samples are scanned column by column, and the samples in a column are scanned vertically from top to bottom and the columns are scanned from left to right;

mode 4: horizontal path two-dimensional conformal copy mode, where the string of reference pixel samples and a sting of current pixel samples are strings of two-dimensional samples with a same shape, the samples are scanned row by row, and the samples in a row are scanned horizontally from left to right and the rows are scanned from top to bottom;

mode 5: derived vertical path one-dimensional string copy mode, where the string of reference pixel samples and a sting of current pixel samples are strings of one-dimensional samples, the samples are scanned column by column, and the samples in a column are scanned vertically with path directions alternating between columns, comprising that odd columns are scanned from top to bottom and even columns are scanned from bottom to top, or even columns are scanned from top to bottom and odd columns are scanned from bottom to top;

mode 6: derived horizontal path one-dimensional string copy mode, where the string of reference pixel samples and a sting of current pixel samples are strings of one-dimensional samples, the samples are scanned row by row, and the samples in a row are scanned horizontally with path directions alternating between rows, comprising that odd rows are scanned from left to right and even rows are scanned from right to left, or even rows are scanned from left to right and odd rows are scanned from right to left;

mode 7: derived vertical path two-dimensional conformal copy mode, where the string of reference pixel samples and a sting of current pixel samples are strings of two-dimensional samples with a same shape, the samples are scanned column by column, columns are scanned from left to right, and the samples in a column are scanned vertically with path directions alternating between columns, comprising that odd columns are scanned from top to bottom and even columns are scanned from bottom to top, or even columns are scanned from top to bottom and odd columns are scanned from bottom to top; and mode 8: derived horizontal path two-dimensional conformal copy mode, where the string of reference pixel samples and a sting of current pixel samples are strings of two-dimensional samples with a same shape, the samples are scanned row by row, rows are scanned from top to bottom, and the samples in a row are scanned horizontally with path directions alternating between rows, comprising that odd rows are scanned from left to right and even rows are scanned from right to left, or even rows are scanned from left to right and odd rows are scanned from right to left, when coding is performed on the coding block using a coding mode of mixing the palette coding and string copy coding, a path scan mode of the palette coding is consistent with the copy path shape mode of the string copy coding.

3. The method according to claim 1, wherein performing the copy coding on the pixel sample segments comprises obtaining reference pixel sample segments that match with the pixel sample segments from a set of the reconstructed reference pixel samples;

wherein the set of the reconstructed reference pixel samples comprises: reconstructed samples and/or variants of the reconstructed samples; and wherein the variants of the reconstructed samples comprise samples generated by processing and/or transforming the reconstructed samples.

4. The method according to claim 1, wherein determining the coding mode of the coding block comprises:

constructing or acquiring a palette, and/or performing pre-coding on pixels of the coding block to determine the coding mode of the pixel sample segment, and/or determining the copy path shape mode of the string copy coding of the coding block, and/or determining the path scan mode of the palette coding of the coding block.

5. An image decoding method comprising:

parsing bitstream data of a decoding block, and determining decoding modes of pixel sample segments of the decoding block; and performing hybrid decoding on the decoding block using a plurality of decoding modes, comprising performing decoding on the pixel sample segments of the decoding block using two decoding modes which are palette decoding and string copy decoding, the decoding block is a decoding region of an image, comprising at least one of the following: a largest coding unit, LCU, a coding tree unit, CTU, a coding unit, CU, a sub-region of the CU, a prediction unit, PU, a transform unit, TU, and an asymmetric partition, AMP, the pixel sample segments comprise any one of the following: a pixel, a pixel component, and a pixel index; wherein, performing hybrid decoding on the decoding block using a plurality of decoding modes comprises:

obtaining parameters of the pixel sample segments from the bitstream data of the decoding block, wherein the parameters comprise palette parameters and/or copy parameters, wherein, performing decoding on any one of the pixel sample segments of the decoding block using the corresponding decoding modes comprises:

when the pixel sample segments use the palette decoding mode, performing palette decoding on the pixel sample segments according to the palette parameters;

wherein the palette parameters comprise at least one of the following: an index of a palette pixel sample value, a length of an index run for repeating the index, a length of an index run for copying an upper index;

when the pixel sample segments use string copy decoding, determining a copy path shape mode of the string copy decoding of the decoding block, and obtaining a string of reference pixel samples from a set of reconstructed reference pixel samples according to the copy path shape mode and the copy parameters, wherein the copy parameters comprise at least one of the following parameters: a copy position and a copy size, wherein the set of the reconstructed reference pixel samples comprises: reconstructed samples and/or variants of the reconstructed samples;

wherein the variants of the reconstructed samples comprise samples generated by processing and/or transforming the reconstructed samples.

6. The method according to claim 5, further comprising:

after the string of reference pixel samples is obtained from the set of the reconstructed reference pixel samples according to the copy path shape mode and the copy parameters, assigning values of the string of reference pixel samples directly or indirectly to the pixel sample segments, the copy path shape mode of the string copy decoding comprises any one of the following modes:

mode 1: vertical path one-dimensional string copy mode, where the string of reference pixel samples and a sting of current pixel samples are strings of one-dimensional samples, the samples are scanned column by column, and the samples in a column are scanned vertically from top to bottom;

mode 2: horizontal path one-dimensional string copy mode, where the string of reference pixel samples and a sting of current pixel samples are strings of one-dimensional samples, the samples are scanned row by row, and the samples in a row are scanned horizontally from left to right;

mode 3: vertical path two-dimensional conformal copy mode, where the string of reference pixel samples and a sting of current pixel samples are strings of two-dimensional samples with a same shape, the samples are scanned column by column, and the samples in a column are scanned vertically from top to bottom and the columns are scanned from left to right;

mode 4: horizontal path two-dimensional conformal copy mode, where the string of reference pixel samples and a sting of current pixel samples are strings of two-dimensional samples with the same shape, the samples are scanned row by row, and the samples in a row are scanned horizontally from left to right and the rows are scanned from top to bottom;

mode 5: derived vertical path one-dimensional string copy mode, where the string of reference pixel samples and a sting of current pixel samples are strings of one-dimensional samples, the samples are scanned column by column, and the samples in a column are scanned vertically with path directions alternating between columns, comprising that odd columns are scanned from top to bottom and even columns are scanned from bottom to top, or even columns are scanned from top to bottom and odd columns are scanned from bottom to top;

mode 6: derived horizontal path one-dimensional string copy mode, where the string of reference pixel samples and a sting of current pixel samples are strings of one-dimensional samples, the samples are scanned row by row, and the samples in a row are scanned horizontally with path directions alternating between rows, comprising that odd rows are scanned from left to right and even rows are scanned from right to left, or even rows are scanned from left to right and odd rows are scanned from right to left;

mode 7: derived vertical path two-dimensional conformal copy mode, where the string of reference pixel samples and a sting of current pixel samples are strings of two-dimensional samples with a same shape, the samples are scanned column by column, columns are scanned from left to right, and the samples in a column are scanned vertically with path directions alternating between columns, comprising that odd columns are scanned from top to bottom and even columns are scanned from bottom to top, or even columns are scanned from top to bottom and odd columns are scanned from bottom to top; and mode 8: derived horizontal path two-dimensional conformal copy mode, where the string of reference pixel samples and a sting of current pixel samples are strings of two-dimensional samples with a same shape, the samples are scanned row by row, rows are scanned from top to bottom and the samples in a row are scanned horizontally with path directions alternating between rows, comprising that odd rows are scanned from left to right and even rows are scanned from right to left, or even rows are scanned from left to right and odd rows are scanned from right to left, when decoding is performed on the decoding block using a decoding mode of mixing the palette decoding and string copy decoding, a path scan mode of the palette decoding is consistent with the copy path shape mode of the string copy decoding.

7. The method according to claim 5, wherein
the set of the reconstructed reference pixel samples comprises: reconstructed samples and/or variants of the reconstructed samples;
wherein the variants of the reconstructed samples comprise samples generated by processing and/or transforming the reconstructed samples.

8. An image coding apparatus, comprising:
a coding mode determination module configured to determine a coding mode of a coding block; and
a coding module configured to perform hybrid coding on the coding block using a plurality of coding modes, comprising performing coding on pixel sample segments in the coding block using two coding modes which are
palette coding and string copy coding, wherein
the coding block is a coding region of an image, comprising at least one of the following: a largest coding unit, LCU, a coding tree unit, CTU, a coding unit, CU, a sub-region of the CU, a prediction unit, PU, a transform unit, TU, and an asymmetric partition, AMP,
the pixel sample segments comprise any one of the following: a pixel, a pixel component, and a pixel index; wherein
when using palette coding, the coding module is configured to perform coding on any one of the pixel sample segments in the coding block by the following way:
performing palette coding on the pixel sample segments to generate palette parameters related to palette decoding;
when using string copy coding, the coding module is further configured to perform coding on any one of the pixel sample segments in the coding block using string copy coding by the following way:
performing string copy coding on any of the pixel sample segments to generate copy parameters related to copy coding, obtaining a string of reference pixel samples matching with the pixel sample segments from a set of the reconstructed reference pixel samples according to a copy path shape mode of the string copy coding of the coding block.

9. The apparatus according to claim 8, wherein
the palette parameters comprise at least one of the following parameters: an index of a palette pixel sample value, a length of an index run for repeating the index, a length of an index run for copying an upper index; and/or
the copy parameters comprise at least one of the following parameters: a copy position, and a copy size,
the copy path shape mode of the string copy coding comprises any one of the following modes:
mode 1: vertical path one-dimensional string copy mode, where the string of reference pixel samples and a sting of current pixel samples are strings of one-dimensional samples, the samples are scanned column by column, and the samples in a column are scanned vertically from top to bottom;

mode 2: horizontal path one-dimensional string copy mode, where the string of reference pixel samples and a sting of current pixel samples are strings of one-dimensional samples, the samples are scanned row by row, and the samples in a row are scanned horizontally from left to right;

mode 3: vertical path two-dimensional conformal copy mode, where the string of reference pixel samples and a sting of current pixel samples are strings of two-dimensional samples with a same shape, the samples are scanned column by column, and the samples in a column are scanned vertically from top to bottom and the columns are scanned from left to right;

mode 4: horizontal path two-dimensional conformal copy mode, where the string of reference pixel samples and a sting of current pixel samples are strings of two-dimensional samples with a same shape, the samples are scanned row by row, and the samples in a row are scanned horizontally from left to right and the rows are scanned from top to bottom;

mode 5: derived vertical path one-dimensional string copy mode, where the string of reference pixel samples and a sting of current pixel samples are strings of one-dimensional samples, the samples are scanned column by column, and the samples in a column are scanned vertically with path directions alternating between columns, comprising that odd columns are scanned from top to bottom and even columns are scanned from bottom to top, or even columns are scanned from top to bottom and odd columns are scanned from bottom to top;

mode 6: derived horizontal path one-dimensional string copy mode, where the string of reference pixel samples and a sting of current pixel samples are strings of one-dimensional samples, the samples are scanned row by row, and the samples in a row are scanned horizontally with path directions alternating between rows, comprising that odd rows are scanned from left to right and even rows are scanned from right to left, or even rows are scanned from left to right and odd rows are scanned from right to left;

mode 7: derived vertical path two-dimensional conformal copy mode, where the string of reference pixel samples and a sting of current pixel samples are strings of two-dimensional samples with a same shape, the samples are scanned column by column, columns are scanned from left to right, and the samples in a column are scanned vertically with path directions alternating between columns, comprising that odd columns are scanned from top to bottom and even columns are scanned from bottom to top, or even columns are scanned from top to bottom and odd columns are scanned from bottom to top; and mode 8: derived horizontal path two-dimensional conformal copy mode, where the string of reference pixel samples and a sting of current pixel samples are strings of two-dimensional samples with a same shape, the samples are scanned row by row, rows are scanned from top to bottom, and the samples in a row are scanned horizontally with path directions alternating between rows, comprising that odd rows are scanned from left to right and even rows are scanned from right to left, or even rows are scanned from left to right and odd rows are scanned from right to left, when coding is performed on the coding block using a coding mode of mixing the palette coding and string copy coding, a path scan mode of the palette coding is consistent with the copy path shape mode of the string copy coding.

10. The apparatus according to claim 8, wherein
the coding module is configured to perform the copy coding on the pixel sample segments by the following way: obtaining reference pixel sample segments that match with the pixel sample segments from a set of the reconstructed reference pixel samples;
wherein the set of the reconstructed reference pixel samples comprises: the reconstructed samples and/or variants of the reconstructed samples; and
wherein the variants of the reconstructed samples comprise samples generated by processing and/or transforming the reconstructed samples.

11. The apparatus according to claim 8, wherein,
the coding mode determination module is configured to determine the coding mode of the coding block by the following way: constructing or acquiring a palette, and/or performing pre-coding on the pixels of the coding block to determine the coding mode of the pixel sample segment, and/or determining the copy path shape mode of the string copy coding of the coding block, and/or determining the path scan mode of the palette coding of the coding block.

12. An image decoding apparatus, comprising:
a parsing module configured to parse bitstream data of a decoding block, and determine decoding modes of pixel sample segments of the decoding block; and
a decoding module configured to perform hybrid decoding on the decoding block using a plurality of decoding modes, comprising performing decoding on the pixel sample segments of the decoding block using two decoding modes which are palette decoding and string copy decoding, wherein
the decoding block is an decoding region of an image, comprising at least one of the following: a largest coding unit, LCU, a coding tree unit, CTU, a coding unit, CU, a sub-region of the CU, a prediction unit, PU, a transform unit, TU, and an asymmetric partition, AMP,
the pixel sample segments comprise any one of the following: a pixel, a pixel component, and a pixel index; wherein,
the decoding module is configured to perform hybrid decoding on the decoding block using a plurality of decoding modes by the following way: obtaining parameters of the pixel sample segments from the bitstream data of the decoding block,
wherein the parameters comprise palette parameters and/or copy parameters,
the decoding module is configured to perform decoding on any one of the pixel sample segments of the decoding block using the corresponding decoding modes by the following way:
when the pixel sample segments use the palette decoding mode, performing palette decoding on the pixel sample segments according to the palette parameters;
wherein
the palette parameters comprise at least one of the following: an index of a palette pixel sample value, a length of an index run for repeating the index, a length of an index run for copying an upper index;
when the pixel sample segments use string copy decoding, determining a copy path shape mode of the string copy decoding of the decoding block, and obtaining a string of reference pixel samples from a set of reconstructed reference pixel samples according to the copy path shape mode and the copy parameters, wherein the copy parameters comprise at least one of the following parameters: a copy position and a copy size, wherein the set of the reconstructed reference pixel samples comprises: the reconstructed samples and/or variants of the reconstructed samples;

wherein the variants of the reconstructed samples comprise samples generated by processing and/or transforming the reconstructed samples.

13. The apparatus according to claim 12, wherein the decoding module is further configured to, after the string of reference pixel samples is obtained from the set of the reconstructed reference pixel samples according to the copy path shape mode and the copy parameters, assign values of the string of reference pixel samples directly or indirectly to the pixel sample segments, wherein the copy path shape mode of the string copy decoding comprises any one of the following modes:

mode 1: vertical path one-dimensional string copy mode, where the string of reference pixel samples and a sting of current pixel samples are strings of one-dimensional samples, the samples are scanned column by column, and the samples in a column are scanned vertically from top to bottom;

mode 2: horizontal path one-dimensional string copy mode, where the string of reference pixel samples and a sting of current pixel samples are strings of one-dimensional samples, the samples are scanned row by row, and the samples in a row are scanned horizontally from left to right;

mode 3: vertical path two-dimensional conformal copy mode, where the string of reference pixel samples and a sting of current pixel samples are strings of two-dimensional samples with a same shape, the samples are scanned column by column, and the samples in a column are scanned vertically from top to bottom and the columns are scanned from left to right;

mode 4: horizontal path two-dimensional conformal copy mode, where the string of reference pixel samples and a sting of current pixel samples are strings of two-dimensional samples with the same shape, the samples are scanned row by row, and the samples in a row are scanned horizontally from left to right and the rows are scanned from top to bottom;

mode 5: derived vertical path one-dimensional string copy mode, where the string of reference pixel samples and a sting of current pixel samples are strings of one-dimensional samples, the samples are scanned column by column, and the samples in a column are scanned vertically with path directions alternating between columns, comprising that odd columns are scanned from top to bottom and even columns are scanned from bottom to top, or even columns are scanned from top to bottom and odd columns are scanned from bottom to top;

mode 6: derived horizontal path one-dimensional string copy mode, where the string of reference pixel samples and a sting of current pixel samples are strings of one-dimensional samples, the samples are scanned row by row, and the samples in a row are scanned horizontally with path directions alternating between rows, comprising that odd rows are scanned from left to right and even rows are scanned from right to left, or even rows are scanned from left to right and odd rows are scanned from right to left;

mode 7: derived vertical path two-dimensional conformal copy mode, where the string of reference pixel samples and a sting of current pixel samples are strings of two-dimensional samples with a same shape, the samples are scanned column by column, columns are scanned from left to right, and the samples in a column are scanned vertically with path directions alternating between columns, comprising that odd columns are scanned from top to bottom and even columns are scanned from bottom to top, or even columns are scanned from top to bottom and odd columns are scanned from bottom to top; and mode 8: derived horizontal path two-dimensional conformal copy mode, where the string of reference pixel samples and a sting of current pixel samples are strings of two-dimensional samples with a same shape, the samples are scanned row by row, rows are scanned from top to bottom and the samples in a rows are scanned horizontally with path directions alternating between rows, comprising that odd rows are scanned from left to right and even rows are scanned from right to left, or even rows are scanned from left to right and odd rows are scanned from right to left, when decoding is performed on the decoding block using a decoding mode of mixing the palette decoding and string copy decoding, a path scan mode of the palette decoding is consistent with the copy path shape mode of the string copy decoding.

14. The apparatus according to claim 12, wherein the set of the reconstructed reference pixel samples comprises: the reconstructed samples and/or variants of the reconstructed samples;

wherein the variants of the reconstructed samples comprise samples generated by processing and/or transforming the reconstructed samples.

* * * * *